(12) United States Patent
Abeyasekera

(10) Patent No.: US 12,018,655 B2
(45) Date of Patent: Jun. 25, 2024

(54) PROVIDING AUXILIARY POWER USING OFFSHORE WIND TURBINES

(71) Applicant: VESTAS WIND SYSTEMS A/S, Aarhus N (DK)

(72) Inventor: Tusitha Abeyasekera, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 144 days.

(21) Appl. No.: 17/633,870

(22) PCT Filed: Aug. 6, 2020

(86) PCT No.: PCT/DK2020/050228
§ 371 (c)(1),
(2) Date: Feb. 8, 2022

(87) PCT Pub. No.: WO2021/023356
PCT Pub. Date: Feb. 11, 2021

(65) Prior Publication Data
US 2022/0364546 A1 Nov. 17, 2022

(30) Foreign Application Priority Data
Aug. 8, 2019 (EP) .................................. 19190792

(51) Int. Cl.
*F03D 7/04* (2006.01)
*F03D 7/02* (2006.01)

(52) U.S. Cl.
CPC ........... *F03D 7/048* (2013.01); *F03D 7/0284* (2013.01)

(58) Field of Classification Search
CPC ........ F03D 7/048; F03D 7/0284; F03D 9/257; Y02B 10/70; Y02E 10/76; Y02E 60/60;
(Continued)

(56) References Cited

U.S. PATENT DOCUMENTS

2008/0284172 A1* 11/2008 Nielsen ................... F03D 7/026
290/44
2013/0175801 A1* 7/2013 Matzen ..................... H02P 9/10
290/44

FOREIGN PATENT DOCUMENTS

CN 105811439 B 4/2018
EP 3316437 A1 5/2018
(Continued)

OTHER PUBLICATIONS

European Patent Office, Extended European Search Report for Application 19190792.2-1202 dated Jan. 13, 2020.
(Continued)

*Primary Examiner* — Joseph Ortega
(74) *Attorney, Agent, or Firm* — Patterson + Sheridan, LLP

(57) ABSTRACT

Embodiments herein describe operating wind turbines in an offshore park to provide auxiliary power to a local AC grid or to an onshore grid during a grid malfunction. In one embodiment, the offshore park is coupled via a HVDC link to an onshore grid. When the HVDC link is down, a substation in the park includes a backup generator for creating a weak grid for powering auxiliary systems in a pilot turbine. The wind turbines in the park can switch to an auxiliary control system help power the auxiliary systems in the substation and in other turbines. In another embodiment, the offshore park is AC coupled to an onshore grid using a transformer in the substation. The wind turbines can participate in a brown or black start following a grid fault by switching to operating using the auxiliary control system.

19 Claims, 13 Drawing Sheets

(58) Field of Classification Search
CPC ........ Y02E 10/72; Y02E 10/727; H02J 3/388;
H02J 9/08; H02J 11/00; H02J 3/36; H02J
3/381; F05B 2240/95; F05B 2270/1074
See application file for complete search history.

(56) References Cited

FOREIGN PATENT DOCUMENTS

| | | |
|---|---|---|
| EP | 3316438 A1 | 5/2018 |
| WO | 2018172489 A1 | 9/2018 |
| WO | 2019014015 A1 | 1/2019 |
| WO | 2019145006 A1 | 8/2019 |
| WO | 2021023356 A1 | 2/2021 |

OTHER PUBLICATIONS

PCT, International Search Report for Application PCT/DK2020/050228 dated Oct. 26, 2020.
PCT, Written Opinion of The International Searching Authority for Application PCT/DK2020/050228 dated Oct. 26, 2020.

\* cited by examiner

PROVIDING AUXILIARY POWER USING OFFSHORE WIND TURBINES

BACKGROUND

Field of the Invention

Embodiments presented in this disclosure generally relate to using a wind turbine in an offshore wind park to supply auxiliary power to a local AC grid and to an onshore grid.

Description of the Related Art

Offshore wind turbines are desired in many situations instead of onshore wind turbines since stronger wind speeds are typically available offshore when compared to land. Moreover, offshore wind turbines are not obstructed by trees, hills, buildings, etc. To couple the offshore wind turbines to an onshore grid (which may be located tens or hundreds of kilometers away), a wind turbine operator may use a HVDC link instead of transmitting AC signals which may improve transmission efficiency. For underwater power cables, HVDC avoids the heavy currents required to charge and discharge the cable capacitance each cycle. Alternatively, offshore wind parks can be AC coupled to the onshore grid (rather than using a DC link).

The provision of a DC or an AC coupling between offshore wind parks and an onshore grid brings challenges in restarting operation after a power fault, and it is an object of the invention to overcome at least some of these challenges.

SUMMARY

According to an embodiment of the invention, there is provided a method for controlling a renewable power plant. The renewable power plant comprises a wind turbine park comprising a plurality of wind turbines connected to a local power network and a substation having a back-up generator and an AC/DC converter. A high-voltage DC (HVDC) link connects the renewable power plant to a main power network via the AC/DC converter. The method comprises, upon determination that the HVDC link is unavailable: operating the back-up generator disposed in the substation to supply power to the local power network, thereby forming a weak grid; operating one or more auxiliary systems within a pilot wind turbine of the plurality of wind turbines using power drawn from the weak grid; and operating the pilot wind turbine to supply power to the local power network to increase the power level of the grid formed on the local power network.

By increase the power level it is meant that the power output to the grid from generators is increased above the power level of the weak grid formed by the generator.

The wind turbine park may comprise an offshore wind park connected via the HVDC link to an onshore power network.

The method may comprise, while the pilot wind turbine is supplying power to the local power network: operating one or more auxiliary systems within one or more of the remaining wind turbines of the plurality of wind turbines using power drawn from the local power network; and operating the one or more remaining wind turbines to supply power to the local power network.

The method may comprise, while the pilot wind turbine is supplying power to the local power network: operating one or more auxiliary systems within the substation using power drawn from the local power network; and operating the AC/DC converter using power drawn from the local power network to reconnect the park with the HVDC link.

Operating the one or more auxiliary systems within the substation may comprises powering at least one of an air conditioning system, heating, and/or cooling system for an AC/DC converter and a pump disposed on the substation.

The pilot and/or remaining wind turbines may be operated using an auxiliary control system while the HVDC link is unavailable that is different to a primary control system. The method may comprise, upon determining that the HVDC link is functioning, operating the plurality of wind turbines using a primary control system to transmit power on the HVDC link, wherein the primary control system is different to the auxiliary control system.

The wind turbine park may be an offshore turbine park. The HVDC link may couple the offshore turbine park to an onshore grid. The plurality of wind turbines may not contain backup generators.

The method may comprise synchronizing voltages and/or frequencies corresponding to the plurality of wind turbines to a local AC grid in the wind turbine park.

The backup generator may comprise a battery energy storage system.

According to another aspect of the invention there is provided a method for controlling a power network. The power network comprises an offshore wind turbine park comprising a plurality of offshore wind turbines connected to an offshore local power network and an onshore wind turbine park comprising a plurality of onshore wind turbines connected to an onshore local power network. The onshore and offshore parks are connected by an AC link. The method comprises, upon determination that a fault has occurred in the power network: supplying back-up power to a pilot wind turbine of the plurality of offshore wind turbines; operating one or more auxiliary systems within the pilot wind turbine using the back-up power; and operating the pilot wind turbine to supply power to the power network to contribute to forming the grid.

Supplying back-up power to a pilot wind turbine may comprise: operating an onshore backup generator to provide auxiliary power to the onshore local power network and the offshore local power network via the AC link, thereby forming a weak grid. The onshore back-up generator may be separate to the onshore wind turbines.

The method may comprise, prior to determining the fault, maintaining the onshore backup generator in a hot-standby state so that backup power is immediately available when the fault occurs.

Supplying back-up power to a pilot wind turbine may comprise drawing power from energy storage housed within the pilot wind turbine.

The method may comprise, while the pilot wind turbine is supplying power to the local power network: operating one or more auxiliary systems within one or more of the onshore wind turbines using power drawn via the AC link; and operating the one or more onshore wind turbines to supply power to the onshore local power network.

At least the pilot wind turbine may be operated using an auxiliary control system while the fault is occurring, the auxiliary control system being different to a primary control system of the turbines. The method may comprises, upon determining that the fault has passed, operating the plurality of wind turbines using a primary control system to supply power on power network, wherein the primary control system is different to the auxiliary control system.

The method may comprise synchronizing voltages and frequencies corresponding to the plurality of wind turbines to the local power networks.

According to another aspect of the invention, there is provided a method for controlling a renewable power plant. The renewable power plant comprises a wind turbine park comprising a plurality of wind turbines connected to a local power network and a substation. A high-voltage link connects the renewable power plant to a main power network. The method comprises, upon determination that the high-voltage link is unavailable: operating a back-up generator to supply power to the local power network, thereby forming a weak grid; operating one or more auxiliary systems within a pilot wind turbine of the plurality of wind turbines using power drawn from the weak grid; and operating the pilot wind turbine to supply power to the local power network to increase the power level of the grid formed on the local power network.

The high-voltage link may comprise a high-voltage AC link, the substation may comprise auxiliary systems including one or more transformers, and the back-up generator may be provided in the substation.

According to another aspect of the invention, there is provided a method that includes, upon determining a high-voltage DC (HVDC) link disposed in a substation for a wind turbine park is unavailable, operating a backup generator disposed in the substation to provide power to an auxiliary systems in the substation and operating a plurality of wind turbines in the wind turbine park using an auxiliary control system, where the plurality of wind turbines provide auxiliary power to supplement the power provided to the auxiliary systems by the backup generator. The method also includes, upon determining the HVDC link is functioning, operating the plurality of wind turbines using a primary control system to transmit power on the HVDC link where the primary control system is different from the auxiliary control system.

Another embodiment described herein is a method that includes upon determining a fault in an onshore grid, operating a plurality of wind turbines in an offshore wind turbine park using an auxiliary control system to provide auxiliary power to the onshore grid, wherein the onshore grid is AC coupled to the plurality of wind turbines by a grid transformer and a circuit breaker disposed in a substation in the offshore wind turbine park and switching the plurality of wind turbines from using the auxiliary control system to a primary control system to restore the onshore grid, wherein the primary control system is different from the auxiliary control system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
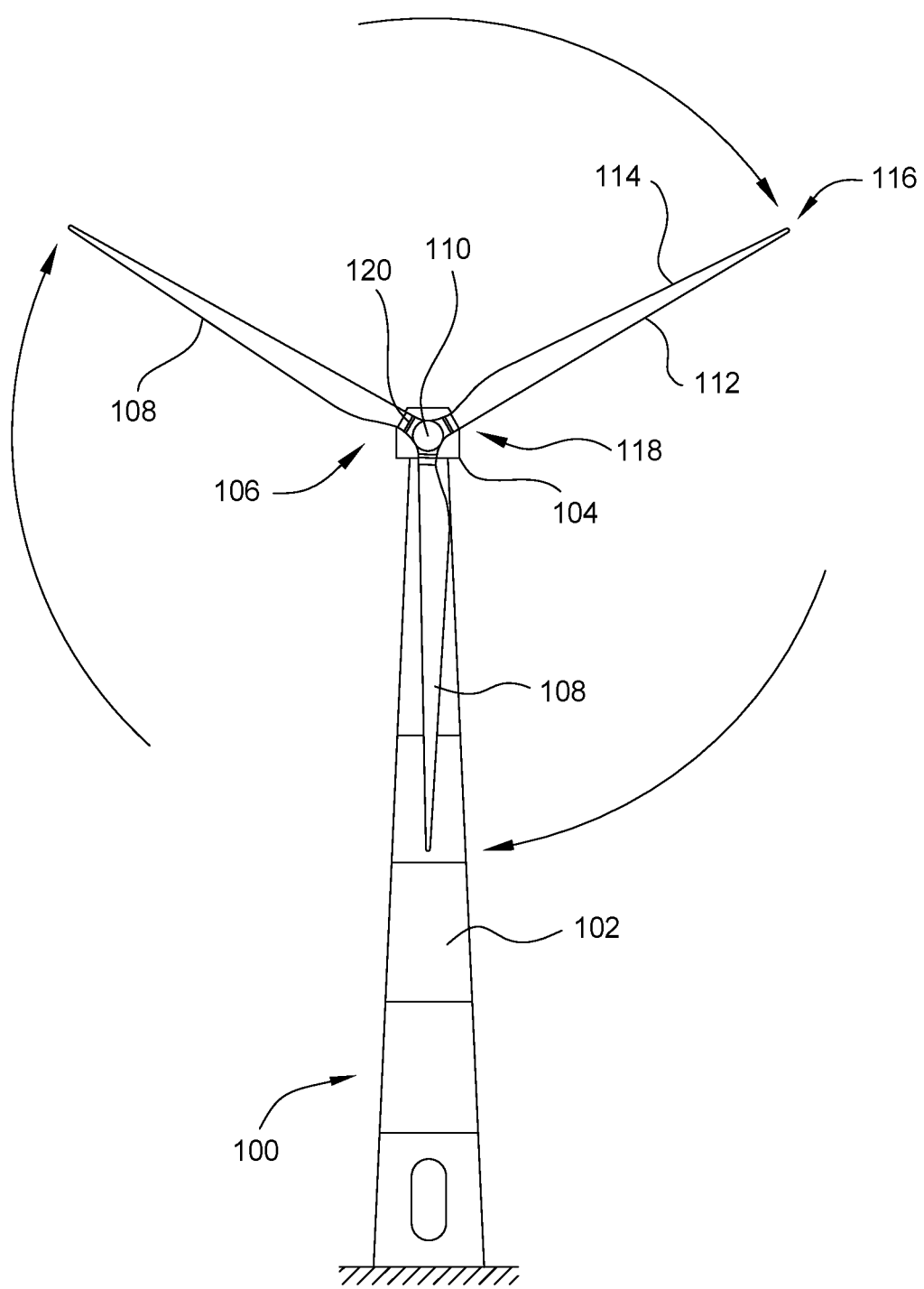
FIG. 1 illustrates a diagrammatic view of a wind turbine, according to an embodiment described in this present disclosure.

As used herein, the terms 'brown start' and 'black start' refer to processes for restoring part or all of an electrical grid following a partial or complete shutdown. In both a brown and a black start, increasing numbers of power generating units, which are wind turbines in the embodiments below, are restarted. Power from the first power generating units to be restarted is provided to subsequent generating units to bring them back online and back to power generation. Accordingly, at the beginning of each, one or more generating units act as grid-forming units, after which the units brought back online become grid-following units as they take power supplied by the grid-forming units. A brown start differs from a black start in how the power is initially supplied to the grid-forming units. In a brown start, a back up generator located remotely from the or each grid-forming power generating unit is used to form a weak grid which is used by a grid-forming unit to resume generation. In a black start, a power storage unit within the or each grid-forming power generating unit provides power to the auxiliary systems of the power generating unit to enable it to begin operation. Generally therefore, no grid is formed in a black start until the grid-forming turbine is operational and power is supplied to auxiliary turbines through an internally connected system, whereas in a brown start a grid exists for the grid-forming turbine to initially draw power from.

A weak grid, also referred to as a weak grid interconnection, can be defined as a grid with a low short-circuit ratio, typically less than 3.0. A weak grid may also be defined as a grid in which a connected park has an output substantially similar to the load capacity of the network to which it is connected, i.e. the MW rating of the generating units is comparable with the MVA level of the connected network. Accordingly, during a brown start, a weak grid is formed due to the back-up generator having a low generational rating compared to the size of the network and the capacity of that network. Weak grids often indicate that the network has a low fault level and/or is operating close to its design limits.

Embodiments herein describe operating wind turbines in an offshore park to provide auxiliary power to a local AC grid or to an onshore grid during a grid malfunction. In one embodiment, the offshore park is coupled via an HVDC link to an onshore grid. In addition to the wind turbines, the offshore park can include a substation that contains an AC-DC converter that couples the local AC grid in the park to the HVDC link and the onshore grid. When the HVDC link is down (non-functioning), the substation includes a backup generator (e.g., a gas or diesel generator) for powering auxiliary systems in the substation, such as a cooling system or a pump. Rather than relying solely on the backup generator to power these auxiliary systems during an HVDC link failure, the wind turbines in the park can switch from operating using a primary control system to an auxiliary control system. The wind turbines, along with the backup generator, can power the auxiliary systems in the substation as well as auxiliary systems in the turbines themselves. As a result, the size and complexity of the backup generator in the substation can be greatly reduced. Further, the wind park does not need any backup generators for the wind turbines. This assumes that there is adequate wind to enable sufficient power to be generated.

In another embodiment, the offshore park is AC coupled to an onshore grid using a transformer in the substation (rather than using an HVDC link). This substation may also include a backup generator which is used when there is a grid fault. As above, rather than relying solely on the backup generator, the wind turbines can operate using the auxiliary control system to assist the backup generator to power the auxiliary systems in the substation and the wind turbines. Doing so can reduce the size, complexity, and operational costs of the backup generator in the substation.

Further, the wind turbines can participate in a brown start following a grid fault. In that scenario, the onshore grid may be coupled to backup generators which are run in a hot-standby state so that these generators can provide power immediately to the grid during a failure. In response to a grid fault, the operator of the onshore grid can instruct the wind turbines to operate using the auxiliary control system to supplement the power provided by the onshore backup generators. This combined power can then be used to startup onshore generators, as well as help switch the wind turbines back to the primary control system. As a result, the number of onshore backup generators needed to perform a brown start can be greatly reduced. Further, in another embodiment, the onshore grid may not use any onshore backup generators, in which case the onshore grid relies entirely on the power provided by the wind turbines when operating in the auxiliary control system to perform a black start (where the grid has no power rather than a weak grid established by the onshore backup generators when performing a brown start).

EXAMPLE EMBODIMENTS

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
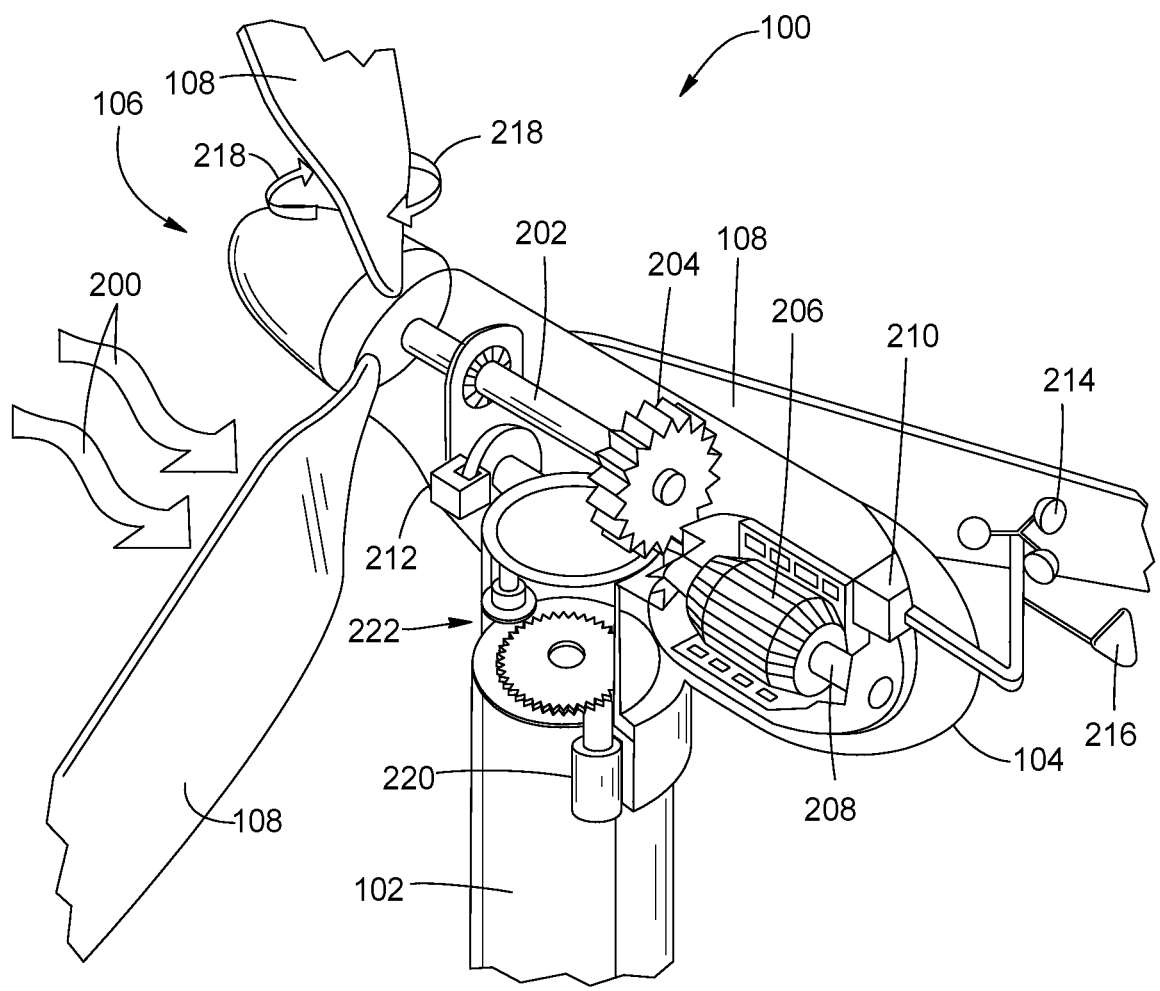
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears 204 in a gearbox mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind. Where the wind turbine is configured to participate in a black start, the wind turbine may include energy storage or a form of back-up generator (not shown) within or associated with the turbine 100, for example in the nacelle 104, the tower 102, or the transition piece platform.

Figure 3:
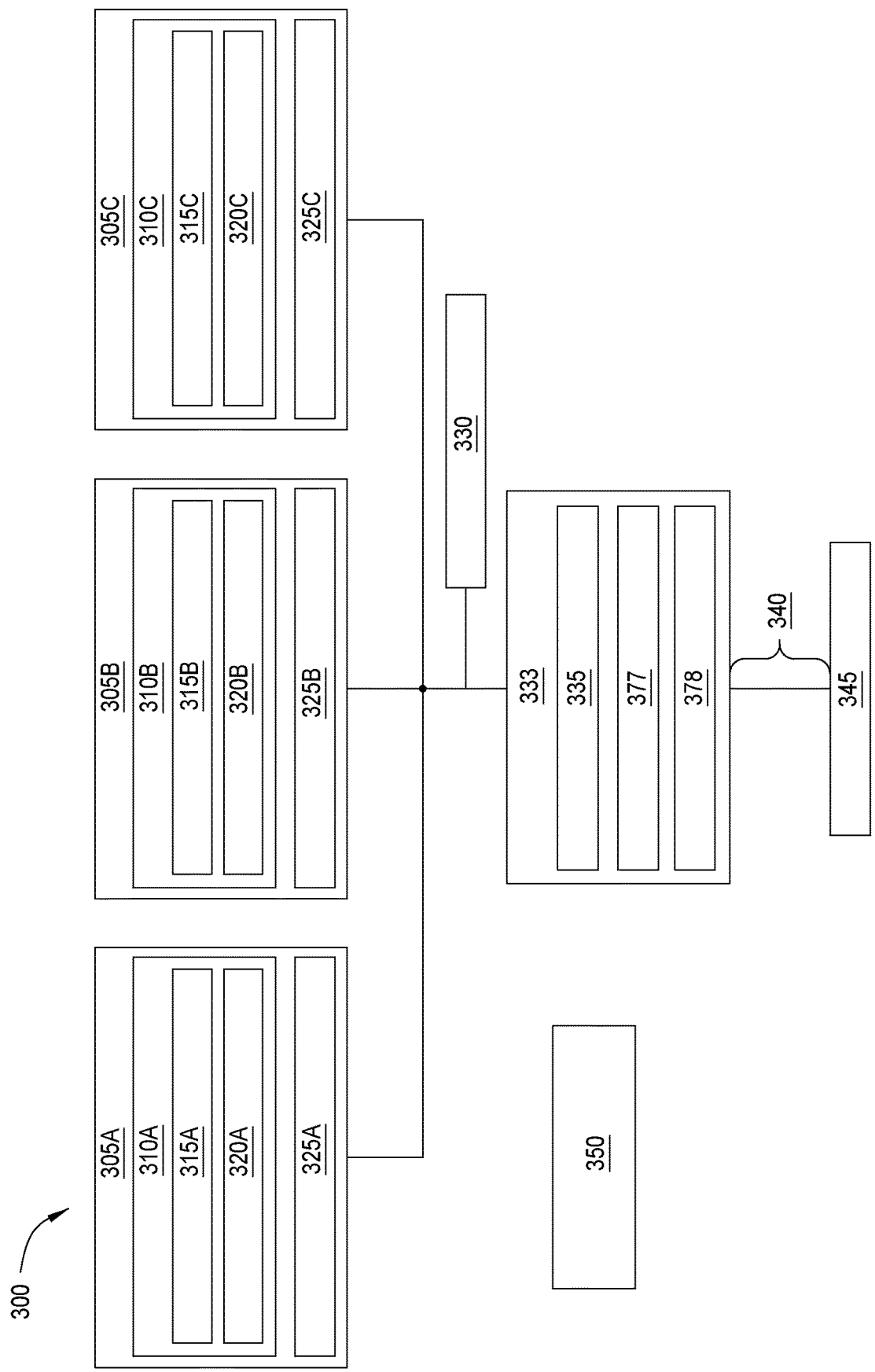
FIG. 3 is a block diagram of a wind park that includes at least one wind turbine that operates in different modes depending on the functionality of an HVDC link according to an embodiment described in this present disclosure.

FIG. 3 is a block diagram of an offshore wind turbine park 300 that includes multiple wind turbines that operate in different modes depending on the functionality of an HVDC link 340 according to an embodiment described in this present disclosure. In this example, the wind park 300 is an offshore wind park that is coupled to an onshore grid 345 via the HVDC link 340. However, the embodiments below can also be applied to onshore wind parks that use an HVDC link 340 to transmit power to a distant grid.

The wind park 300 includes three wind turbines 305A, 305B, and 305C, each of which includes a turbine controller 310 and an auxiliary system 325 (e.g., yaw controller/motors, pumps, deicing system, etc.). The turbine controllers 310 have two separate control systems that control the operation of the respective wind turbines 305 depending on the functionality of the HVDC link 340. In one embodiment, the turbine controllers 310 use a primary control system 315 when the HVDC link 340 is functional which results in power being transmitted from the park 300 to the onshore grid 345. The turbine controllers 310 can use an auxiliary control system 320 when the HVDC link is non-functional.

The park 300 also includes an offshore grid substation 333 that contains an AC-DC converter 335, an auxiliary system 377, and a backup generator 378. The wind turbines 305 are coupled to the HVDC link 340 via the offshore grid substation 333 and its AC-DC converter 335. In one embodiment, the offshore grid substation 333 is disposed on a platform in the offshore wind park 300 and includes a structure that encloses the AC-DC converter 335, the auxiliary system 377, and the backup generator 378. However, in another embodiment, the offshore grid substation 333 and AC-DC converter 335 may be disposed on the same platform but be contained within different enclosures. In either case, the AC-DC converter 335 is used to convert the power on a local AC grid 330 into DC power for transmission on the HVDC link 340. In one embodiment, the substation 333 is disposed remotely from the wind turbines 310. That is, the substation 333 and the wind turbines may be disposed on separate platforms in the offshore wind park 300.

The AC-DC converter 335 can be an uncontrolled converter or a controlled converter (e.g., either a self-commutated or an even line-commutated converter). For example, many current offshore wind parks use a controlled converter to connect the turbines to an onshore grid which is typically more expensive than the uncontrolled diode rectifier, which is described in FIG. 12. The control techniques recited herein can be used regardless of the type of AC-DC converter 335 used to couple the local AC grid 330 to the HVDC link 340. For example, the primary control system 315 can be a control technique where the AC-DC converter 335 is actively controlled by a wind park controller 350. In one embodiment, the power outputted by the wind turbines 305 when using the primary control system 315 is determined by the AC-DC converter 335. That is, the power outputted by the individual wind turbines 305 may be dictated by the converter 335 rather than from desired set points transmitted by, for example, the wind park controller 350.

Alternatively, if the AC-DC converter 335 is an uncontrolled diode rectifier, the primary control system 315 may be the high-power mode described below where a proportional integral (PI) controller and a reactive power adjuster are activated to control the outputs of the individual wind turbines 305. In this embodiment, the output of the wind turbines 305 is controlled by desired set points rather than the AC-DC converter 335.

The backup generator 378 (e.g., a fossil fuel generator such as diesel) provides backup power to the auxiliary system 377 when the HVDC link 340 is unavailable. For example, the auxiliary system 377 may be a cooling system that cools the converter 335 and may need to be powered regardless whether the HVDC link 340 is functional. In another example, the auxiliary system 377 may be a pneumatic or actuator system for controlling switch gears or other equipment in the substation 333. If the HVDC link 340 to the onshore grid 345 is lost, the backup generator 378 (e.g., a gas or diesel generator) activates to power the auxiliary system (or systems) 377 in the substation.

However, the size and complexity of the backup generator 378 may be large and it may be costly to provide sufficient power for the auxiliary system 377. Moreover, the larger the size of the backup generator 378, the larger its operating costs such as exchanging old fuel and maintaining the generator 378. The embodiments herein enable the size of the backup generator 378 to be greatly reduced by operating the wind turbines 305 using the auxiliary control system 320 to supplement the power provided by the backup generator 378 on the local AC grid 330. For example, when the HVDC link 340 is unavailable, the backup generator 378 may provide only a fraction of the power (e.g., less than 20%) needed to power the auxiliary system 377 while the turbines 305 provide the remaining power (e.g., more than 80%) using the auxiliary control system 320. As a result, the backup generator 378 can be much smaller than a generator that has to power the auxiliary system 377 on its own.

In one embodiment, the backup generator 378 can be completely eliminated from the substation and the park 300 can rely solely on the wind turbines using the auxiliary control system 320 to power the auxiliary system 377 in the substation 333. However, including the backup generator 378 may be preferred since wind power may not be sufficient (or reliable enough) for satisfying the power needs of the auxiliary system 377.

In addition to providing power to the substation 333 when the HVDC link 340 is non-functional, the wind park controller 350 may instruct one or more of the turbine controllers 310 to operate using the auxiliary control system 320 to power the auxiliary systems 325 in the wind turbines 305 themselves. For example, the three wind turbines 305 shown here may be designated as backup wind turbines in the park 300 that provide power to the auxiliary systems 325 of all the wind turbines in the park 300 and the auxiliary system 377 in the substation 333 when the HVDC link 340 is down. Put differently, all but the three turbines 305 shown in FIG. 3 in the wind park 300 may be shut down when the HVDC link 340 is disabled. Instead of being shut down, the wind turbines 305A, 305B, and 305C switch from operating using the primary control system 315 to operating using the auxiliary control system 320 which outputs a sufficient amount of power on a local AC grid 330 to operate the auxiliary systems in the shutdown turbines (not shown) as well as the auxiliary systems 325A, 325B, 325C on the turbines 305A, 305B, and 305C and the auxiliary system 377 in the substation 333.

In one embodiment, the auxiliary control system 320 and the primary control system 315 are respective software applications or modules that execute depending on the status of the HVDC link 340. Thus, the wind park controller 350 can instruct the individual turbine controllers to execute either the auxiliary control system 320 or the primary control system 315 depending on the status of the HVDC link 340. For example, the turbine controllers 310 may include at least one processor and sufficient memory to store the software applications. However, in other embodiments, the auxiliary control system 320 and the primary control system 315 include hardware or firmware components.

Furthermore, although FIG. 3 illustrates coupling the wind park 300 to an HVDC link, in another embodiment, the wind park 300 is coupled to an HVAC link via an AC-AC converter which converts the AC power signals on the local AC grid 330 to high-voltage AC power signals suitable for the HVAC link. These examples are described in later figures.

Figure 4:
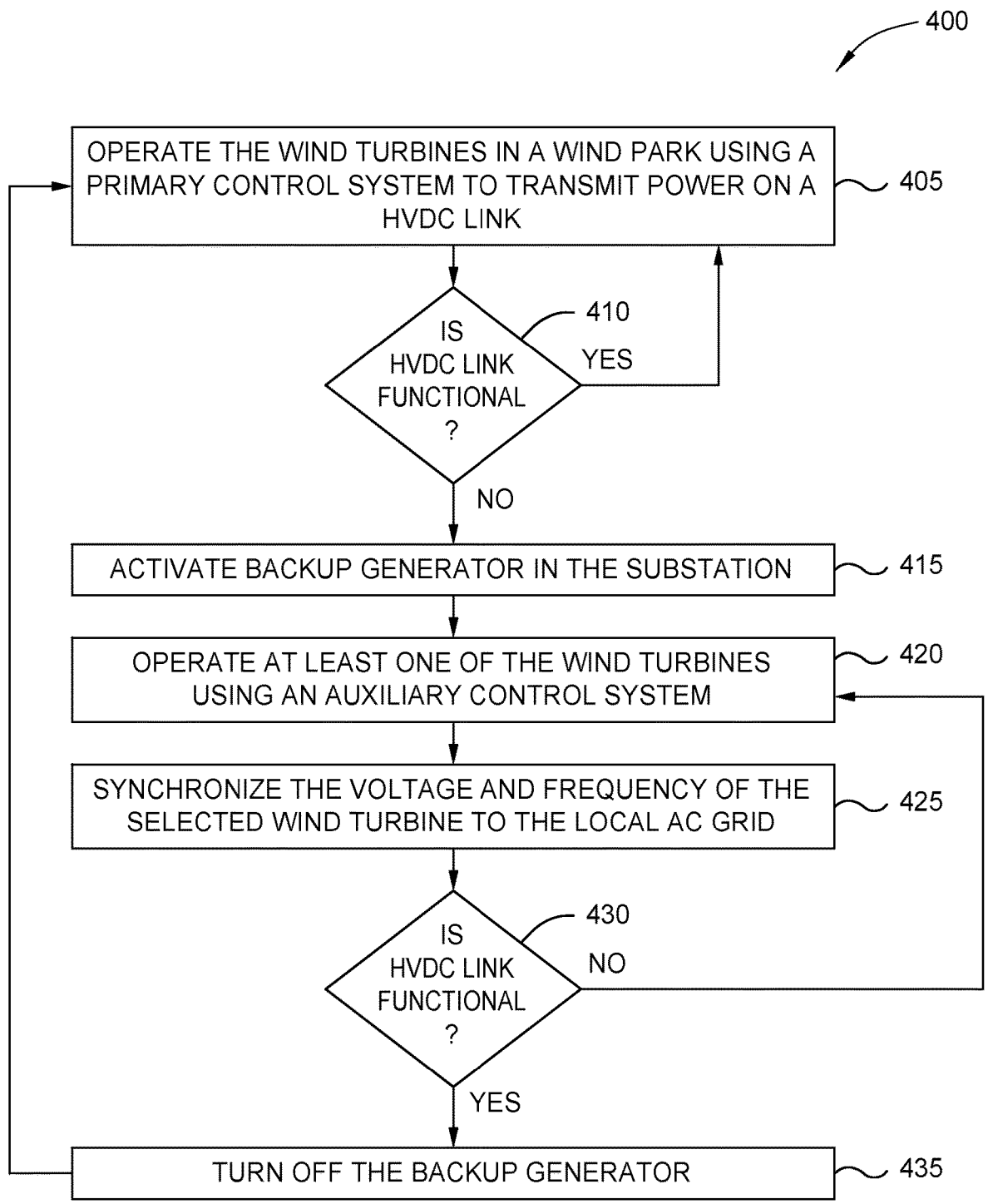
FIG. 4 is a flowchart for powering auxiliary systems when an HVDC link is non-functional according to an embodiment described in this present disclosure.

FIG. 4 is a flowchart of a method 400 for powering auxiliary systems when an HVDC link is non-functional according to an embodiment described in this present disclosure. At block 405, the wind turbines in the offshore wind park (or an onshore wind park) operate using a primary control system to transmit power on an HVDC link to an onshore grid. The details of the primary control system are described below in FIG. 5.

At block 410, the wind park controller determines whether the HVDC link is functional (e.g., available). The HVDC link can be cut or an onshore station can be disconnected thereby disconnecting the wind park from a primary grid (e.g., the onshore grid). Moreover, the grid operator may voluntarily decide to disconnect the HVDC link. Thus, the HVDC link is non-functional whenever the link is not energized, whether because of an accident (e.g., the line being cut or a grid fault) or intentionally (e.g., the onshore grid is not ready to connect to the wind park). If the HVDC link remains functional, the method 400 returns to block 405.

However, if the HVDC link is non-functional, the method 400 proceeds to block 415 where the backup generator in the substation activates to provide power to the auxiliary system (s) in the substation. This auxiliary system may be a cooling system or actuator system for equipment in the substation such as an AC-DC converter (that couples to the HVDC link) or switch gears. Moreover, in addition to activating the backup generator, some of the wind turbines may be shut down. However, as discussed below, some of the wind turbines may continue to operate in a different mode. As used herein, shutting down the wind turbines means that the wind turbines do not generate output power onto the local AC grid. However, other auxiliary systems in the shutdown wind turbines may still operate such as yawing motors, pumps, or heating elements for preventing ice buildup on the nacelle or blades. The power for operating these auxiliary systems may be provided by the wind turbines that have not shut down.

In one embodiment, the backup generator is not sufficient to power the auxiliary system in the substation. That is, to save costs or space, the backup generator may be specifically selected to output only a portion of the power used by the auxiliary system. The remaining power is provided by the wind turbines that are not shut down—i.e., continue to generate power.

At block 420, the wind turbines that have not been shut down are operated using the auxiliary control system. That is, the wind turbines are switched from a first mode (e.g., a high-power mode) where the turbines operate using the primary control system to a second mode (e.g., an island mode) where the turbines operate using the auxiliary control system. In one embodiment, some of the wind turbines in the wind park are grid forming wind turbines while others are grid following turbines.

At block 425, the wind turbines synchronize their voltage and frequency to the local AC grid. In one embodiment, since the backup generator is also coupled to the local AC grid, the wind turbines, when operating using the auxiliary control system, synchronize with the backup generator to provide power to the local AC grid. Doing so distributes power to the various auxiliary systems in the wind park such as the auxiliary systems in the shutdown wind turbines as well as the auxiliary systems in the substation.

At block 430, the wind park controller determines whether the HVDC link is functional. If not, the method 400 returns to block 420 where some or all of the wind turbines operate using the auxiliary control system to provide power to the local AC grid and power auxiliary systems. However, in one embodiment, if the power generated by the wind turbines using the auxiliary control system is sufficient to power the auxiliary systems, then the amount of power generated by the backup generator in the substation can be reduced. In one embodiment, the backup generator may be shut down once the wind park controller determines the wind turbines can produce sufficient power during the time the HVDC link is nonfunctional.

If the HVDC link is functional, the method 400 returns to block 405 where the wind turbines can once again operate using the primary control system and provide power to the onshore grid using the HVDC link. That is, the wind turbines can switch from using the auxiliary control system to the primary control system to output power.

Figure 5:
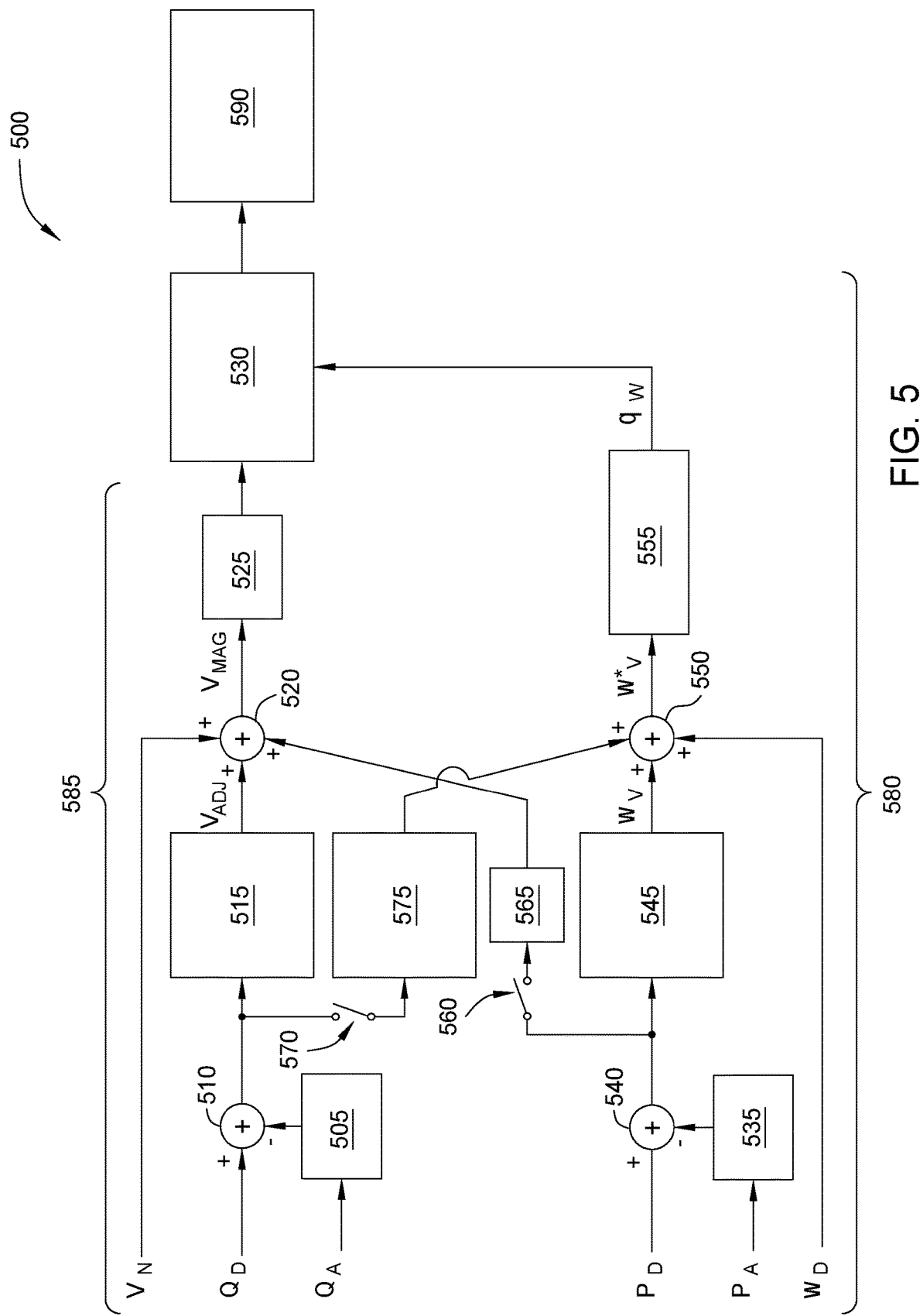
FIG. 5 illustrates a control system of a wind turbine generator according to an embodiment described in this present disclosure.

FIG. 5 illustrates a control system 500 of a wind turbine according to an embodiment described in this present disclosure. Specifically, the control system 500 can have two modes where one mode corresponds to the primary control system and the other corresponds to the auxiliary control system discussed above.

In one embodiment, each wind turbine in a wind park includes a copy of the control system 500. The control system 500 may be performed by a wind turbine controller and may be implemented using solely software, solely hardware, or some mixture of software and hardware elements. In one embodiment, the control system 500 is implemented using a computing system that includes one or more processors and memory.

One advantage of the control system 500 is that there does not need to be high speed data communication between the control systems 500 in the individual wind turbines. That is, the control systems 500 in the individual wind turbines do not need to be synchronized during operation, although the individual control systems 500 may receive reference set points from a central wind park controller. By not requiring communication between the different control systems 500, the reliability of the control system 500 is increased. Moreover, the control system 500 does not need a phase locked loop (PLL) for operation unlike systems that require communication between the control systems in the wind turbines.

The control system 500 has a reactive power control leg 585 and an active power control leg 580. The reactive power control leg 585 receives a desired reactive power value $Q_D$ from the wind park controller and an actual reactive power value $Q_A$ which represents the current reactive power being generated at the output of the grid side converter 590. The actual reactive power value $Q_A$ is passed through an optional filter 505 and is provided to a first adder 510 along with the desired reactive power value $Q_D$. The first adder 510 determines the difference between the desired reactive power value $Q_D$ (i.e., the reactive power the wind park controller wants the wind turbine to output) and the actual reactive power $Q_A$ currently outputted from the wind turbine. This difference is inputted to a voltage lookup module 515 which outputs a voltage adjustment value $V_{ADJ}$ used for adjusting the output voltage of the wind turbine. In one embodiment, the voltage lookup module includes a plurality of incremental voltage values that are mapped to respective differences between the desired and actual reactive power values. The plurality of voltage values for each control system 500 in the various wind turbines may be different, or the same, voltage values. That is, the voltage values for the voltage lookup module 515 in one wind turbine may be different than the voltage values in a second wind turbine.

A second adder 520 adds the voltage adjustment value $V_{ADJ}$ to a nominal voltage $V_N$ (which may be provided by the wind park controller) to output a magnitude voltage $V_{MAG}$. The second adder 520 is also coupled to a PI controller 565 which will be described later. The magnitude voltage $V_{MAG}$ is passed through an optional filter 525 to a three-phase transform module 530. Generally, the three-phase transform module 530 converts the magnitude voltage $V_{MAG}$ and a voltage factor angle $\theta_W$ outputted by the active power control leg 580 to control signals for the grid side converter 590. Put differently, the transform module 530 uses the outputs of the reactive and active power control legs 585 and 580 to generate control signals that operate the switches (e.g., power transistors) in the grid side converter 590 to output corresponding three-phase AC voltage signals.

In the active power control leg 580, the control system 500 receives a desired active power value $P_D$ from the wind park controller and an actual active power value $P_A$ which represents the current active power outputted by the grid side converter 590. The actual active power value $P_A$ is passed through an optional filter 535. A third adder 540 compares the desired active power value $P_D$ to the actual active power value $P_A$ and outputs a difference of the two. This difference is provided to an angular frequency lookup module 545 which outputs a corresponding angular frequency adjustment $\omega_V$. The angular frequency lookup module 545 may include a plurality of incremental angular frequency adjustment values that correspond to respective differences between the actual and desired active power values $P_A$ and $P_D$. The angular frequency adjustment values stored in the angular frequency lookup module 545 can be the same, or different, for the different wind turbines in the park.

The angular frequency adjustment $\omega_V$ outputted by the angular frequency lookup module 545 is passed to a fourth adder 550 which combines the angular frequency adjustment $\omega_V$ with a desired angular frequency $\omega_D$ received from the wind park controller. While the magnitude voltage $V_{MAG}$ outputted by the reactive power control leg 585 controls the magnitude of the AC signal generated by the grid side converter 590, the angular frequencies $\omega_V$ and $\omega_D$ control the frequency of the AC signals. For example, the desired angular frequency $\omega_D$ may represent the desired frequency of the local AC grid (e.g., 50 Hz). The control system 500 uses the angular frequency adjustment $\omega_V$ to increase or decrease the active power generated by the grid side converter to match the desired active power value $P_D$.

The fourth adder 550 outputs a combined angular frequency $\omega_V^*$ to an integrator 555 which outputs the voltage factor angle $\theta_W$. The voltage factor angle $\theta_W$ along with the magnitude voltage $V_{MAG}$ are used by the three-phase transform module 530 to generate control signals that set the magnitude and frequency of a three-phase AC signal outputted by the grid side converter 590.

The control system 500 also includes a switch 560 that selectively couples the PI controller 565 to the output of the third adder 540 and a switch 570 which selectively couples a reactive power adjustor 575 to the output of the first adder 510. When operating as the auxiliary control system (also referred to herein as an island mode), the switches 560 and 570 are open thereby deactivating the PI controller 565 and the reactive power adjustor 575 such that these components do not affect the voltage factor angle $\theta_W$ and the magnitude voltage $V_{MAG}$ generated by the reactive and active power control legs 585 and 580. However, even when the PI controller 565 and reactive power adjustor 575 are deactivated, the control system 500 can still generate AC signals for powering a local load coupled to the local AC grid. As mentioned above, when the control system 500 operates in the mode corresponding to the auxiliary control system, the grid side converter 590 may output AC power for a nearby populated land mass that is connected to the local AC grid. Additionally or alternatively, one or more of the wind turbines in the park may generate auxiliary power for the auxiliary systems in the substation and the other wind turbines in the park. That is, some of the wind turbines may be shut down (i.e., not generating power) while the control system 500 in other wind turbines operate as an auxiliary control system in the island mode to provide auxiliary power for the local AC grid.

In one embodiment, when operating in the island mode corresponding to the auxiliary control system, the control system 500 may not be able to set the actual power outputted to the wind turbine (i.e., the actual reactive and active power values $Q_A$ and $P_A$) to the desired power values (i.e., the desired reactive and active power values $Q_D$ and $P_D$). Instead, the actual power outputted by the wind turbine is dictated by the local load on the turbine.

To switch from the island mode to the high-power mode corresponding to the primary control system, the control system 500 closes the switches 560 and 570 thereby connecting the inputs of the PI controller 565 and the reactive power adjustor 575 to the active power control leg 580 and the reactive power control leg 585, respectively. Although the control system 500 illustrates switches to connect the inputs of the PI controller 565 and the reactive power adjustor 575 to the respective legs 580 and 585, other activation means may be used such as turning on and off the power delivered to the PI controller 565 and reactive power adjustor 575.

Figure 6:
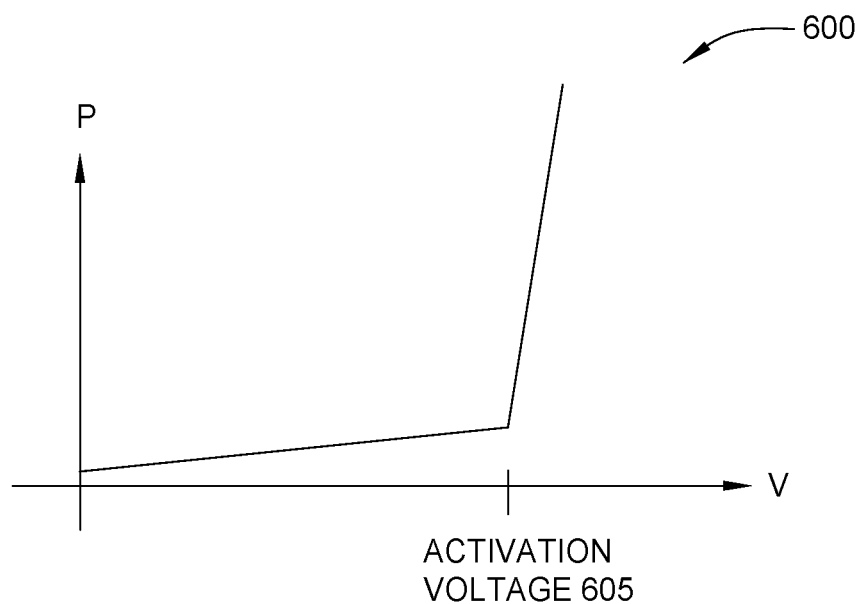
FIG. 6 is a graph illustrating an activation voltage of a diode rectifier according to an embodiment described in this present disclosure.

When switch 560 is closed, the PI controller 565 receives from the third adder 540 the difference between the desired active power value $P_D$ and the actual active power value $P_A$. Although a PI controller is shown, any controller with an integral action can be used such as the PI controller 565 or a proportion-integral-derivative (PID) controller. The PI controller 565 outputs an adjustment voltage which is added to the magnitude voltage $V_{MAG}$ until the actual active power value $P_A$ matches the desired active power value $P_D$. In one embodiment, the PI controller 565 causes the reactive power control leg 585 to increase the magnitude of the AC signals generated by the grid side converter 590 until this magnitude exceeds the cut in voltage of the diodes in the uncontrolled diode rectifier. This is shown in FIG. 6 where a graph 600 illustrates an activation voltage of the diode rectifier according to an embodiment described in this present disclosure. The graph 600 illustrates the power flowing through the diode rectifier on the y-axis and the voltage across the diodes in the x-axis. As the PI controller 565 increases the magnitude of the AC signals generated by the wind turbine, the average voltage across the diodes eventually reaches the activation voltage 605 (i.e., the diode cut in voltage) which activates the diode rectifier and permits power to be transmitted onto the HVDC link. Once activated, the control system 500 can continue to use the PI controller 565 to control the output power of the wind turbine as dictated by the wind park controller. That is, unlike when operating as an auxiliary control system, in the high-power mode corresponding to the primary control system, the control system 500 can control the output power to match the desired power (after the activation voltage 605 has been reached). For example, if the wind park controller sends a new desired active power value $P_D$, the PI controller 565 can adjust the magnitude of the AC signals to output the desired active power.

In addition to activating the PI controller 565 when operating in the high-power mode, the control system 500 also activates the reactive power adjustor 575 by closing the switch 570. Generally, the reactive power adjustor 575 prevents the formation of a circulating reactive power between the wind turbines coupled to the PCC. Because there are an infinite number of solutions depending on how much reactive power each turbine is producing, this can result in circulating reactive power. When the switch 570 is closed, the difference (or error) between the desired reactive power value $Q_D$ and the actual reactive power value $Q_A$ outputted by the adder 510 is transmitted to the reactive power adjustor 575. In turn, the reactive power adjustor 575 outputs an angular frequency value that is sent to the adder 550. That is, the angular frequency value is added to the angular frequency adjustment $\omega_V$ and the desired angular frequency $\omega_D$ to generate the combined angular frequency $\omega_V^*$ for generating the voltage factor angle. A large difference between the desired reactive power value $Q_D$ and the actual reactive power value $Q_A$ means the wind turbine is generating too much reactive power. Thus, the angular frequency value generated by the reactive power adjustor 575 causes the control system 500 to reduce the reactive power being outputted by the grid side converter 590. Conversely, a small difference between the desired reactive power value $Q_D$ and the actual reactive power value $Q_A$ means the wind turbine is generating too little reactive power. In response, the reactive power adjustor 575 increases the reactive power generated by the turbine. If each control system 500 in the wind turbines includes the reactive power adjustor 575, this results in the wind turbines sharing the generation of the reactive current amongst themselves and mitigates the likelihood of a circulating reactive current.

In one embodiment, the control system 500 receives a prompt to switch from the high-power mode (i.e., operating as a primary control system) to the island mode (i.e., operating as an auxiliary control system) when, for example, the HVDC link breaks or is otherwise inoperable. For example, each control system 500 for the wind turbines may receive a command from the wind park controller to switch to the island mode of operation. In response, the control system 500 opens the switches 560 and 570 which deactivates the PI controller 565 and the reactive power adjustor 575. In this manner, the control system 500 can switch between the island mode and the high-power mode of operation.

Figure 7:
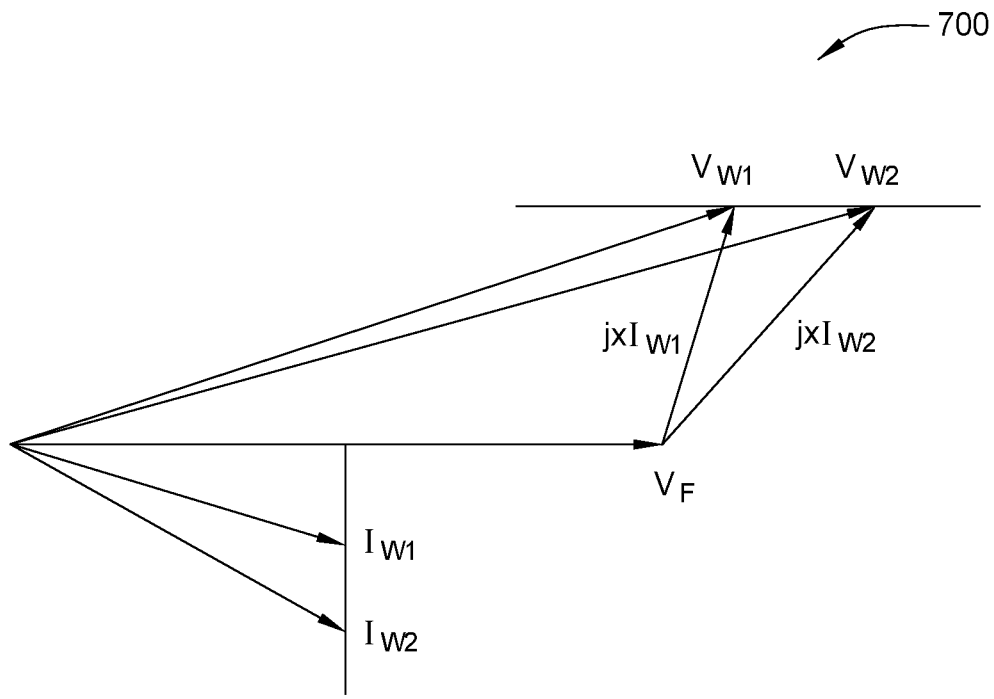
FIG. 7 is a vector diagram according to an embodiment described in this present disclosure.

FIG. 7 is a vector diagram 700 according to an embodiment described in this present disclosure. The vector $V_F$ illustrates the common voltage at the diode rectifier or the point of connection of the offshore park to the network while the vectors $V_{W1}$, $V_{W2}$, $I_{W1}$, and $I_{W2}$ represent respective voltages and currents for two wind turbines in the park—i.e., Wind Turbine 1 (W1) and Wind Turbine 2 (W2). The two current vectors $I_{W1}$ and $I_{W2}$ illustrate that the two wind turbines generate different reactive power. Specifically, Wind Turbine 2 delivers more reactive power than Wind Turbine 1 which means the voltage vector $V_{W2}$ is too large. Stated differently, the angle between the vector $V_F$ and $V_{W2}$ is not optimal. As described above in FIG. 5, the control system 500 includes the reactive power adjustor 575 which can adjust the outputs of the Wind Turbine 2 such that the angle between $V_F$ and $V_{W2}$ is closer to the angle between $V_F$ and $V_{W1}$. As a result, the reactive power output is shared more equally by the wind turbines which can prevent circulating reactive current between the wind turbines.

Figure 8:
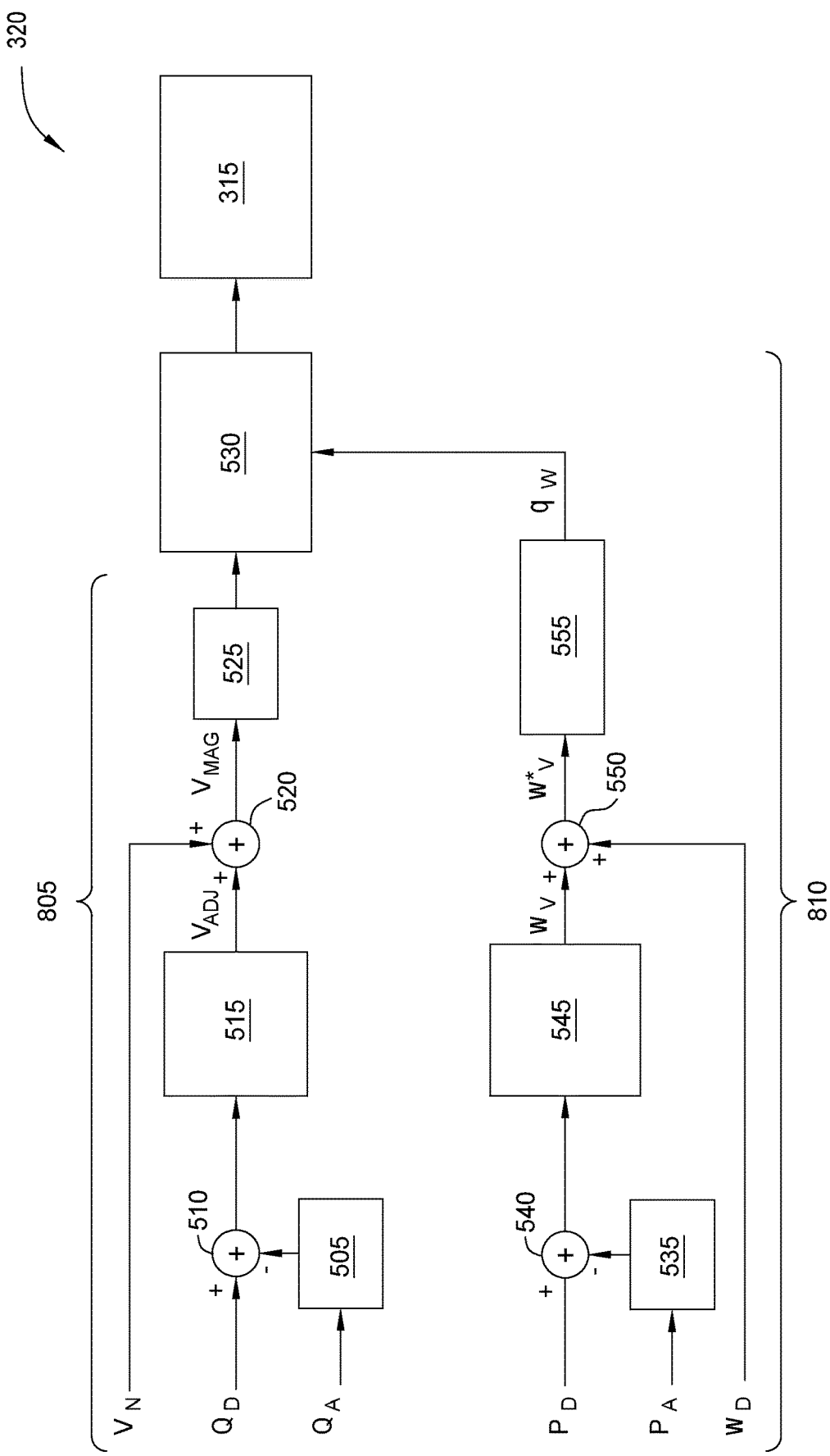
FIG. 8 illustrates an auxiliary control system used by a wind turbine according to an embodiment described in this present disclosure.

FIG. 8 illustrates an auxiliary control system 320 used by a wind turbine when the HVDC link is non-functional according to an embodiment described in this present disclosure. The auxiliary control system 320 is the same as the control system 500 in FIG. 5 except that the auxiliary control system 320 does not include the PI controller 565, the reactive power adjuster 575, and the switches 560, 570. Put differently, the auxiliary control system 320 includes the components used when the wind turbines operate in the island mode when the PI controller 565 and the reactive power adjuster 575 are deactivated.

As shown, the auxiliary control system 320 includes a reactive power control leg 805 and an active power control leg 810. The various components in these legs 805, 810 operate in a same manner as the reactive power control leg 585 and the active power control leg 580 in FIG. 5 when the control system 500 is in the island mode. Thus, the functions of the legs 805 and 810 are not repeated here.

Figure 9:
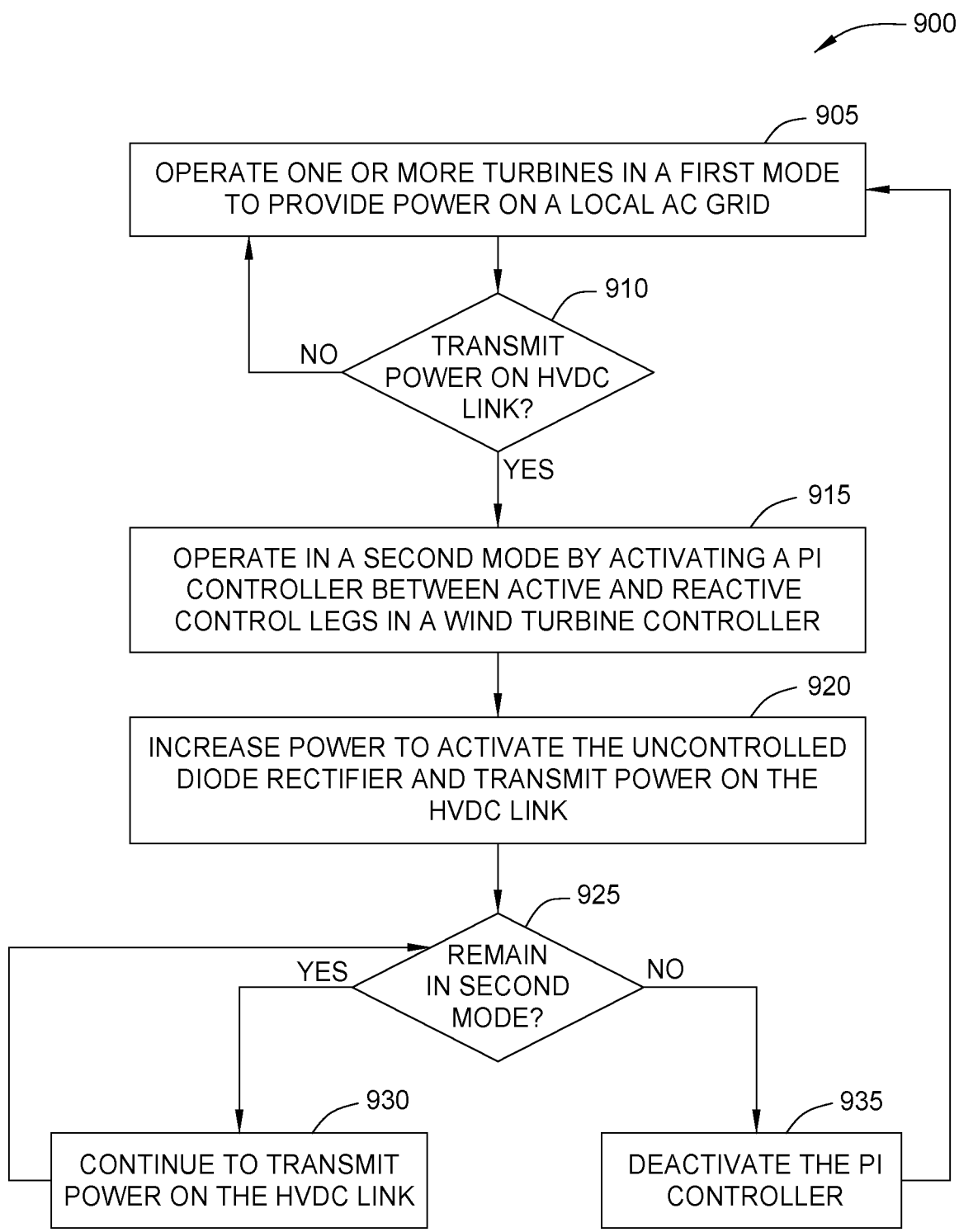
FIG. 9 is a flowchart for operating a wind turbine in different modes according to an embodiment described in this present disclosure.

FIG. 9 is a flow chart of a method 900 for operating a wind turbine in different modes according to an embodiment described in this present disclosure. In one embodiment, the method 900 can be used to connect wind turbines to the HVDC link once the link becomes functional. For example, the method 900 may be performed when a wind turbine park is first connected to an HVDC link, or after the HVDC link has failed and the park is being reconnected to the onshore grid.

At block 905, a wind park controller instructs a control system in a wind turbine to operate in a first mode to provide power to a local AC grid. In one embodiment, the wind park controller instructs a subset of the wind turbines to operate in the first mode (i.e., the island mode). For example, only a few of the turbines in the park may be operated in the island mode to generate auxiliary power for the remaining turbines which do not generate any power. Alternatively, all of the turbines in the park may be operated in the island mode to provide power to the local AC grid which may, for example, include a nearby populated land mass such as an island.

If at block 910 the wind park controller determines not to transmit power on a HVDC link, method 900 returns to block 905 where at least one wind turbine continues to operate in the island mode. Otherwise, method 900 proceeds to block 915 where the wind park controller instructs at least one of the wind turbines to operate in the second mode by activating a PI controller between the active and reactive control legs in a wind turbine controller (e.g., control system 500 in FIG. 5). In one embodiment, the PI controller uses the difference (or error) between actual and desired reactive power values determined in the reactive control leg of the wind turbine controller to generate a voltage adjustment used in the active control leg of the turbine controller. The voltage adjustment increases the magnitude of the AC voltage generated by the wind turbine to activate the diodes in the rectifier so that power is conducted on the HVDC link.

In one embodiment, when the diode rectifier is active and the HVDC link transmits power, a wind turbine currently not transmitting power is synchronized to the wind turbines that are transmitting power on the HVDC link before coupling the wind turbine to the PCC. For example, when electrically coupling a new wind turbine to the PCC, if the angle ω in the control system of the new turbine is not synchronized, coupling the new wind turbine to the wind turbines already generating power can create a short circuit. Thus, before adding the new turbine, its control system may synchronize its value of the angle ω to the same angle value used in the control systems of the wind turbines already transmitting power on the HVDC link. Referring to FIG. 5, in one embodiment, the initial value for the integrator 555 of the new turbine is derived by measuring the phase of the voltage on the low side of the local AC grid. By initializing the integrator 555 to the initial value, the new turbine has the same angle as the currently connected wind turbines, and thus, when the new turbine is coupled to the PCC, the power at the PCC is increased and a short circuit is avoided. This synchronization process can be repeated to couple additional wind turbines to the PCC and the HVDC link.

At block 920, the PI controller in the control system increases power generated by the wind turbine to activate the uncontrolled diode rectifier and transmit power on the HVDC link. As shown in FIG. 6, the PI controller can increase the magnitude of the voltage across the diodes in the rectifier until the diodes are activated and power is transmitted on the HVDC link. Moreover, in the high-power mode the control system can perform power curtailment by setting an active power reference smaller than an optimum power reference calculated by a maximum Cp tracking algorithm.

At block 925, the wind park controller determines whether the wind turbines should remain in the second mode of operation. For example, the wind park controller may keep the individual control systems in the high-power mode so long as the HVDC link is operational. If, however, the HVDC link is cut or an onshore station is disconnected, at block 935 the wind park controller instructs the individual control systems to deactivate the PI controller and the reactive power adjustor and to switch to the first mode of operation. In one embodiment, the wind park controller monitors the output the wind turbines to determine if the voltage spikes (e.g., rises above a threshold) which leads to an overvoltage on the local AC grid. In response, the wind park controller can switch the wind turbines to the first mode to provide over voltage ride-through (OVRT) protection where the maximum voltage reference voltage is limited. Moreover, if an overvoltage is detected, the reference voltage can be reduced leading to a fast reduction of voltage on the local AC grid. In one embodiment, there is no need for communication between the control system in the turbines (i.e., the control systems do not need to be synchronized) when the control system switches from the second mode to the first mode. In one embodiment, the wind park controller can switch some of the wind turbines from the second mode to the first mode while the remaining wind turbines are shut down—i.e., no longer generate power.

However, if an overvoltage condition is not detected, the method 900 proceeds to block 930 where the wind turbines continue to transmit power on the HVDC link. In one embodiment, the control system described above does not need a PLL for normal operation. That is, when in the high-power mode, the control system does not use a traditional or discrete Fourier transform (DFT) based PLL to set the active and reactive power values used to control the output of the wind turbine. Further, the control systems in different wind turbines do not need to communicate with each other when operating in the high-power and island modes of operation which reduces cost and improves reliability. In addition, an uncontrolled diode rectifier can be a less expensive option for coupling the wind turbines to the HVDC link when compared to using alternative coupling systems that are controlled using digital signals.

Although the embodiments herein describe a central wind park controller that sends commands to the individual control systems of the wind turbines (e.g., commands to switch between the first and second modes, commands containing the desired active and reactive power values, power curtailment commands, etc.), the individual control systems can operate even if the communication link between the control system and the wind park controller is lost.

Figure 10:
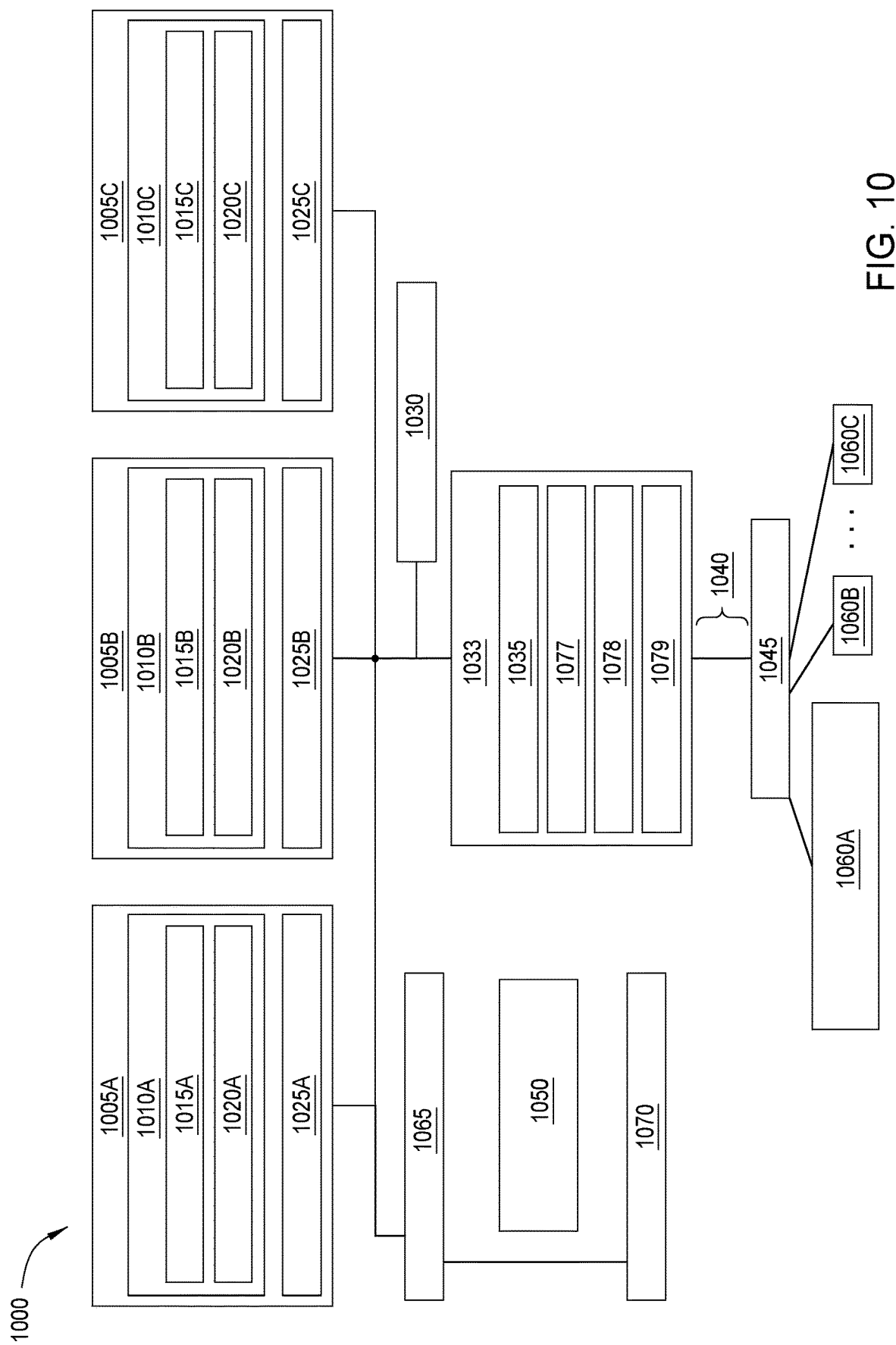
FIG. 10 is a block diagram of a wind park that includes at least one wind turbine that operates in different modes depending on the functionality of the onshore grid according to an embodiment described in this present disclosure.

FIG. 10 is a block diagram of a wind park that includes at least one wind turbine that operates in different modes depending on the functionality of the onshore grid according to an embodiment described in this present disclosure. The wind park 1000 includes multiple wind turbines 1005 with a turbine controller 1010 that can switch between operating using a primary control system 1015 (e.g., a high-power mode) and an auxiliary control system 1020 (e.g., an island mode). These systems have been discussed in above, and are not described in detail here.

Unlike the offshore wind park 300 in FIG. 3, the wind park 1000 is coupled to an onshore grid 1045 using an AC link 1040 (e.g., an HVAC link) rather than an HVDC link. To connect the wind turbines 1005 to the AC link 1040, an offshore grid substation 1033 includes a grid transformer 1035 and a circuit breaker 1079. The power generated by the wind turbines 1005 flows through the transformer 1035 and the circuit breaker 1079 to reach the AC link 1040 and the onshore grid 1045.

The substation 1033 also includes an auxiliary system 1077 and a backup generator 1078. As above, when the grid 1045 fails, the backup generator 1078 can activate to provide power to the auxiliary system 1077 (e.g., a cooling system, pump, or actuator). Further, the wind turbines 1005 can begin operating using the auxiliary control system 1020 to supplement the power generated by the backup generator 1078, thereby reducing the size of the backup generator 1078 relative to an offshore park where the wind turbines 1005 do not have an auxiliary control system (and all shut down when the onshore grid 1045 fails).

In addition to providing power to the auxiliary system 1077 in the substation 1033 and to the auxiliary systems 1025 in the turbines themselves during a grid failure, the wind turbines 1005 can also provide power to the onshore grid 1045 when operating using the auxiliary control system 1020. For example, the wind turbines 1005 can perform a brown start where the wind turbines 1005 couple to a weak onshore grid 1045. As shown, the onshore grid 1045 is coupled to multiple onshore backup generators 1060 (e.g., natural gas generators). In one embodiment, these backup generators 1060 are operated in a hot-standby state. That is, even when the grid 1045 is operational, the backup generators 1060 are active and generating power. Thus, when there is a grid failure 1045, the backup generators 1060 are already ready to provide some power to the onshore grid 1045 which generates a weak AC grid. However, these hot-standby back generators 1060 are expensive and costly to operate (since they are always running in case of a grid failure).

In one embodiment, a grid operator (e.g., a Transmission Service Operator (TSO)) instructs the wind turbines 1005 to operate using the auxiliary control system 1020 during a grid failure. During the failure, the substation 1033 keeps the wind turbines 1005 operating using the auxiliary control system 1020 connected to the AC link 1040 and the onshore grid 1045. Thus, the wind turbines 1005 can supplement the power generated by the onshore backup generators 1060 during a grid failure. As a result, the TSO may require fewer backup generators 1060 which can save capital and operating costs. In this example, the wind turbines 1005 and the onshore backup generator 1060 can operate simultaneously to perform a brown start.

In another embodiment, the onshore backup generators 1060 can be omitted and the onshore grid 1045 can rely on the wind turbines 1005 to form a weak AC grid during a grid failure. That is, the wind turbines 1005 can connect to a dead onshore grid 1045 (referred to as a black start) and provide power for powering up other power plants (not shown) which may be coupled to the onshore grid 1045. However, some TSOs may not want to completely eliminate all the onshore backup generators 1060 since the amount of power that can be provided by the wind turbines 1005 can vary due to the amount of available wind. However, the onshore grid 1045 may be coupled to multiple wind parks distributed in different geographic locations which mitigates the risk that the wind parks cannot provide sufficient power to perform a black start after a grid failure by operating using their auxiliary control systems 1020.

FIG. 10 also illustrates an offshore power plant 1065 coupled to the local AC grid 1030 of the wind park 1000. The offshore power plant 1065 is external to (or separate from) the park 1000 but nonetheless has at least one power cable coupling the power plant 1065 to the AC grid 1030. The power plant 1065 may be an offshore oil or gas platform, floating power plants, or the like. The power plant 1065 can includes its own backup generator 1070. However, when the grid fails 1045, the backup generator 1070 can activate to power auxiliary systems 1050 in the power plant 1065. The wind turbines 1005 can operate in the island mode (e.g., using the auxiliary control system 1020) to supplement the power generated by the backup generator 1070 to power the auxiliary system 1050 in the separate power plant 1065. As a result, the size of the backup generator 1070 can be reduced relative to a backup generator that provides all the power for the auxiliary systems 1050 in the power plant 1065.

Figure 11:
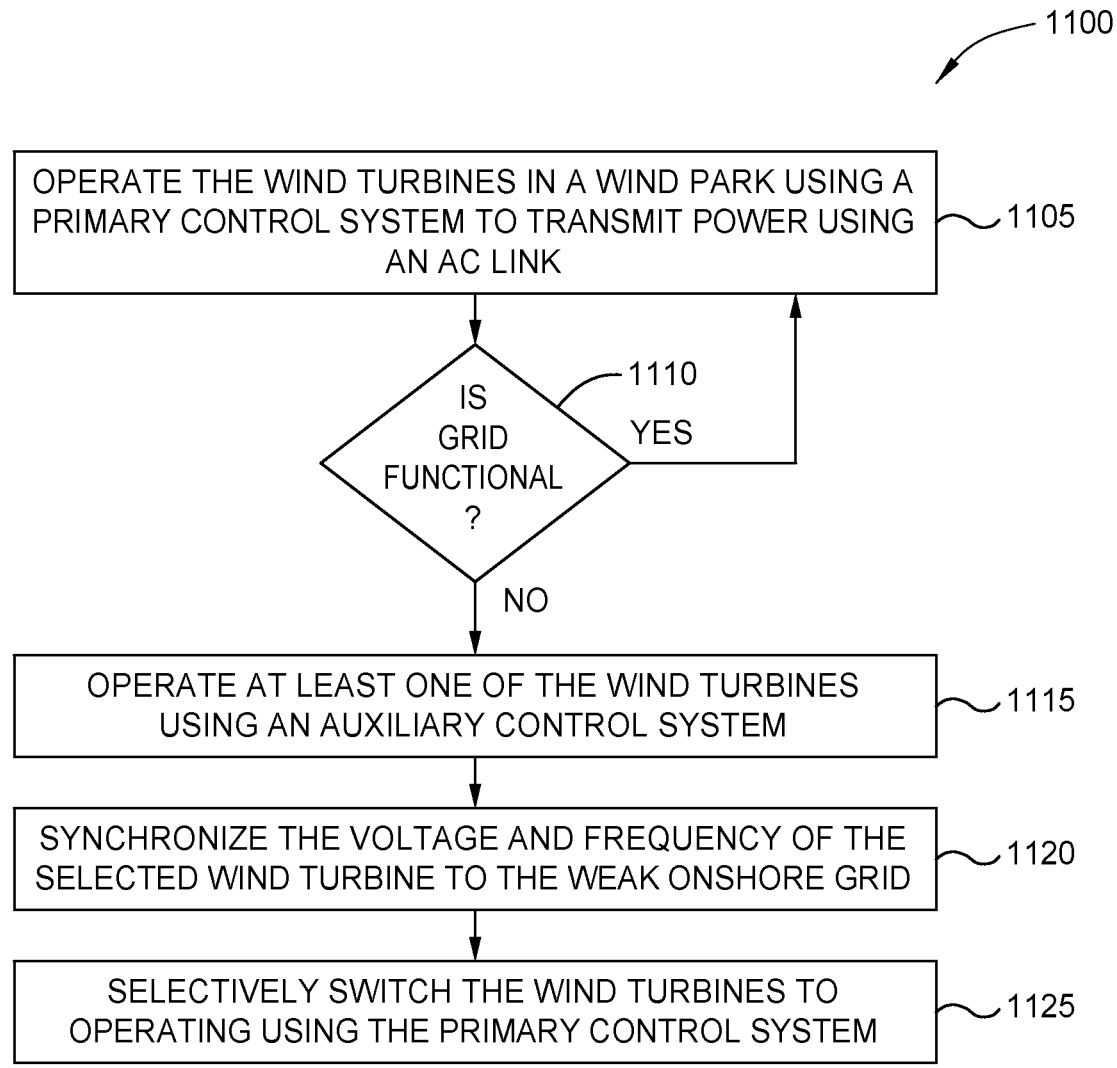
FIG. 11 is a flowchart for powering auxiliary systems and an onshore grid after the onshore grid fails according to an embodiment described in this present disclosure.

FIG. 11 is a flowchart of a method 1100 for powering auxiliary systems and an onshore grid after the onshore grid fails according to an embodiment described in this present disclosure. At block 1105, the wind turbines in an offshore wind park operate using a primary control system (e.g., the high-power mode) to transmit power using an AC link to the onshore grid. In one embodiment, the wind park includes a substation that includes a grid transformer and one or more circuit breakers which couple the wind turbines to the AC link.

At block 1110, the wind part controller determines whether the onshore grid is functional. If so, the method 1100 returns to block 1105. If not, the method 1100 proceeds to block 1115 where the operator of the onshore grid (e.g., the TSO) instructs at least one of the wind turbines in the park to operate using the auxiliary control system (e.g., the island mode). In one embodiment, all of the wind turbines in the wind park may switch to operating using the auxiliary control system. Alternatively, some of the wind turbines may be shut down. In one embodiment, some of the wind turbines in the wind park are grid forming wind turbines while others are grid following turbines.

At block 1120, the wind turbines synchronize their voltage and frequency to the weak onshore grid. In one embodiment, the wind turbines perform a brown start since the onshore grid is partially powered by hot-standby onshore backup generators. The power provided by the wind turbines supplements the power already being provided by the onshore backup generators.

However, in another embodiment, the wind turbines may perform a black start where the onshore grid is unpowered (e.g., there are no hot-standby generators). In that case, the wind turbines 1005 synchronize with each other in order to begin powering the onshore grid to form a weak AC grid.

At block 1125, the wind park controller selectively switches the wind turbines to operate using the primary control system. For example, the turbines that were operating using the auxiliary control system once again begin to operate using the primary control system which enables the grid to recover from the failure. In one embodiment, groups of the turbines switch from the auxiliary control system to the primary control system at different times. Further, the power in the weak AC grid generated by the onshore backup generators and wind turbines when operating using the auxiliary control system can be used to start up other power plants (e.g., gas, coal, or nuclear power plants) that were disconnected from the onshore grid or shut down in response to the grid failure. In this manner, the power provided by the wind turbines when operating in the island mode can be used to restore the onshore grid.

Figure 12:
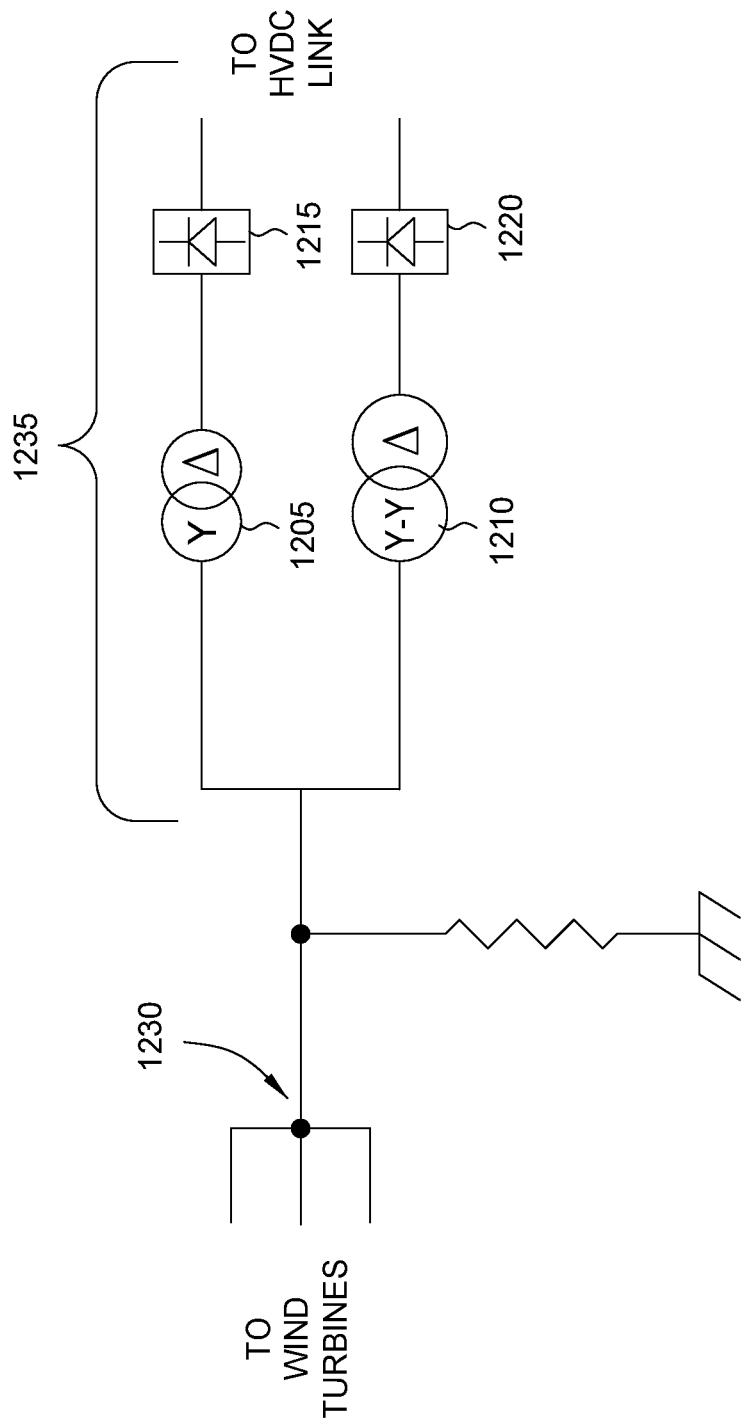
FIG. 12 illustrates an uncontrolled diode rectifier coupled to an HVDC link according to an embodiment described in this present disclosure.

FIG. 12 illustrates the uncontrolled diode rectifier 1235 coupled to the HVDC link according to embodiments described in this present disclosure. The diode rectifier 1235 is just one suitable arrangement of a rectifier that can be used with the control system described above. Other types or arrangements of diode rectifiers 1235 can be used. For example, while FIG. 12 illustrates a 12-pulse rectifier 1235, the rectifier 1235 may include a different number of pulses. In one embodiment, the diode rectifier 1235 is "uncontrolled" because no control signals are needed or used to operate the diode rectifier 1235. As such, the diode rectifier 1235 can include only passive components that do not need digital or analog control signals to operate.

As shown, the diode rectifier 1235 includes a first transformer 1205 and a second transformer 1210 coupled to a point of common coupling (PCC) 1230 for a wind turbine park. The first transformer 1205 is a Y-delta transformer, while the second transformer 1210 is a Y-Y transformer. Further, the rectifier 1235 includes a first diode 1215 and a second diode 1220. Generally, the transformers and diodes in the rectifier 1235 convert the AC power signal provided by the wind turbines at the PCC 1230 to DC power signals that are transmitted on the HVDC link 1240.

The above embodiments in relation to the auxiliary and primary control systems render the wind turbines and their controllers suitable for participation in brown starts where an HVDC link is provided, and brown and black starts where an HVAC link is provided.

As defined above, a so-called 'brown start' is the kick-starting of a turbine using a weak grid formed by one or more back-up generators, and subsequently using the turbine to form the local and/or wider grid. A 'black start' is the kick-starting of the grid using internal energy stores or a generator within a wind turbine. Each of the black and brown starts is useful in specific situations, and can be effectively used to begin generation again after a grid failure or fault. By utilizing the techniques described above, and the general techniques described here in relation to brown and black starts, offshore parks may be used to efficiently restart the wider grid. While onshore parks may be used for this purpose, the use of offshore parks is preferable due to their higher generational capacity and the higher likelihood of offshore wind turbines to have enough wind at high enough speeds and regularity to provide sufficient power. Implementing the techniques in an offshore park enables a faster recovery due to the high rate of increase in power output that an offshore park can achieve. Offshore locations typically have a higher occurrence of wind and so it is more likely that sustained generation will be achieved during a restart scenario.

Additional benefits are brought by the type of start utilized at the offshore park. The use of a brown start at an offshore park according to the embodiments described below, either where an HVDC or HVAC link is present, enables the use of back-up generators either within the onshore grid or at the substation offshore that are smaller and have a lower running cost than traditionally required. The brown start also ensures that individual wind turbines are not required to maintain dedicated storage within their nacelle, tower, or at other locations associated with the turbine that takes up space, is heavy, and requires maintenance that is both difficult and expensive. Instead, a single or limited number of back-up generator is provided at a location that is easy to access, that is cheaper to maintain, and that may be used for other purposes if necessary. The brown start is also implementable regardless of preceding events—the backup generator enables a brown start to be performed at will.

In the case of a black start, the higher capacity of offshore turbines, the prevalence of wind power in offshore locations, and the capability of operating in an islanded mode improve the efficiency of black start in an offshore park. Accordingly, the size of back-up generation in wind turbines for black start can be reduced, reducing both the cost and maintenance requirements of existing turbines because the offshore turbine forming the grid provides an increased power contribution.

Below, two scenarios are considered: first, an offshore park connected to an onshore grid by an HVDC link, and second, an offshore park connected to an onshore grid by an HVAC link. Generally, the two scenarios may be considered together where brown starts are used. Where there is a problem on the wider network, such as an HVDC link failure or a grid fault, typically one that causes partial or full shutdown of the wider power network, a back-up generator is operated to create a temporary, weak grid on part or all of the network. Although a diesel or gas back-up generator is discussed above, the back-up generator may comprise a store of energy operating as a generator, such as a fuel cell or a battery energy storage system, configured to discharge to create the weak grid. Accordingly, the term back-up generator encompasses generators and generation supplies, and may be referred to alternatively as back-up generation supply. Drawing the power generated by the back-up generator from the weak grid, a pilot wind turbine operates its auxiliary systems to enable the turbine to begin supplying power to improve the strength of the grid. The pilot turbine subsequently operates and generates power that is supplied to the network, for use by other turbines in operating their auxiliary systems and other grid-connected systems for enabling restoration of the network to operation. The pilot turbine therefore supplements or replaces the backup generator once it has been re-activated using the power supplied by the backup generator. The two scenarios are explained in more detail below. Black starts in the second scenario are also considered.

In the first scenario, an offshore park is connected to a wider grid by an HVDC link. This setup is described above in relation to FIG. 3. When the HVDC link fails and/or becomes non-functional, or is fault-blocked by the HVDC converter, the offshore park is disconnected from the onshore grid and so there is no power flow from the offshore park to the onshore grid. The HVDC link may be disconnected by accident, or by choice to island the offshore park. The HVDC link may also fail when a blackout occurs on the onshore grid. During an HVDC link failure and/or fault-blocking by the HVDC converter, the wind turbines are shut down to avoid voltage spikes on the local grid of the offshore park. If a blackout has occurred, the wind turbines and other generators at the onshore grid are also shut down.

In these situations, a brown start may be performed. The brown start may enable the HVDC link to be re-established if it failed due to a blackout or once the offshore park is reconnected after being disconnected.

The brown start is performed by creating a weak or low-strength grid at the offshore park. An example can be seen in the flow chart 1300 of FIG. 13. In general, a signal that the HVDC link is down/unavailable is received in the form of a measured current or voltage level at the PCC between the HVDC and the offshore park or another trigger signal from a controller, such as a frequency level, rate of change of frequency, or vector phase shift, meeting a criteria indicating the HVDC link is unavailable. In response, the controller determines that a brown start is required, either based on the measurement or a received signal, and the back-up generator is started to enable generation of back-up power. The back-up generator energizes the local grid of the offshore park, acting as a grid-forming generator, step 1302 in FIG. 13. The grid that is formed is a 'weak' grid. In other words, the generation of the back-up generator is small in comparison to the load capacity, i.e. MVA value or level, of the grid.

The back-up generator forms a weak grid to enable a 'pilot' wind turbine to sufficiently power its auxiliary systems to enable generation of power to restart and the local grid to be re-formed. Once the weak grid is established by the back-up generator, the pilot turbine draws power to its auxiliary systems such as its yaw motor, pitch motor, controllers, pumps, deicing system, etc. This is shown as step 1304 in FIG. 13. Drawing power for its auxiliary systems from the weak grid formed by the back-up generator, the pilot turbine operates, at step 1306 of FIG. 13, to begin generating power in the usual way—it energizes lubrication systems, begins cooling systems, yaws to a wind-generating position, pitches its blades relative to the wind, and unbrakes the rotor, which operation for beginning generation would be familiar to the skilled person.

Once the pilot turbine has drawn power from the weak grid and is generating power the back-up generator may be stopped, switched to an idling mode, or used to supplement the grid and power other systems such as the auxiliary systems of the substation, for example during periods in which there is no wind or the wind speed drops.

The power generated by the pilot turbine is supplied to the local grid. This power is drawn by other turbines to power their auxiliary systems and subsequently to begin generating power to supply to the local grid, see steps 1308 and 1310 of FIG. 13.

The pilot turbine and subsequent turbines powering up based on the formed grid may be operated in an auxiliary control mode and/or using an auxiliary control system as described above. The number of turbines permitted to power up may be limited by a controller until the HVDC link is operable again. The number of turbines will be determined according to the available and predicted wind speed, and to power block load demands from the auxiliary systems.

Figure 13:
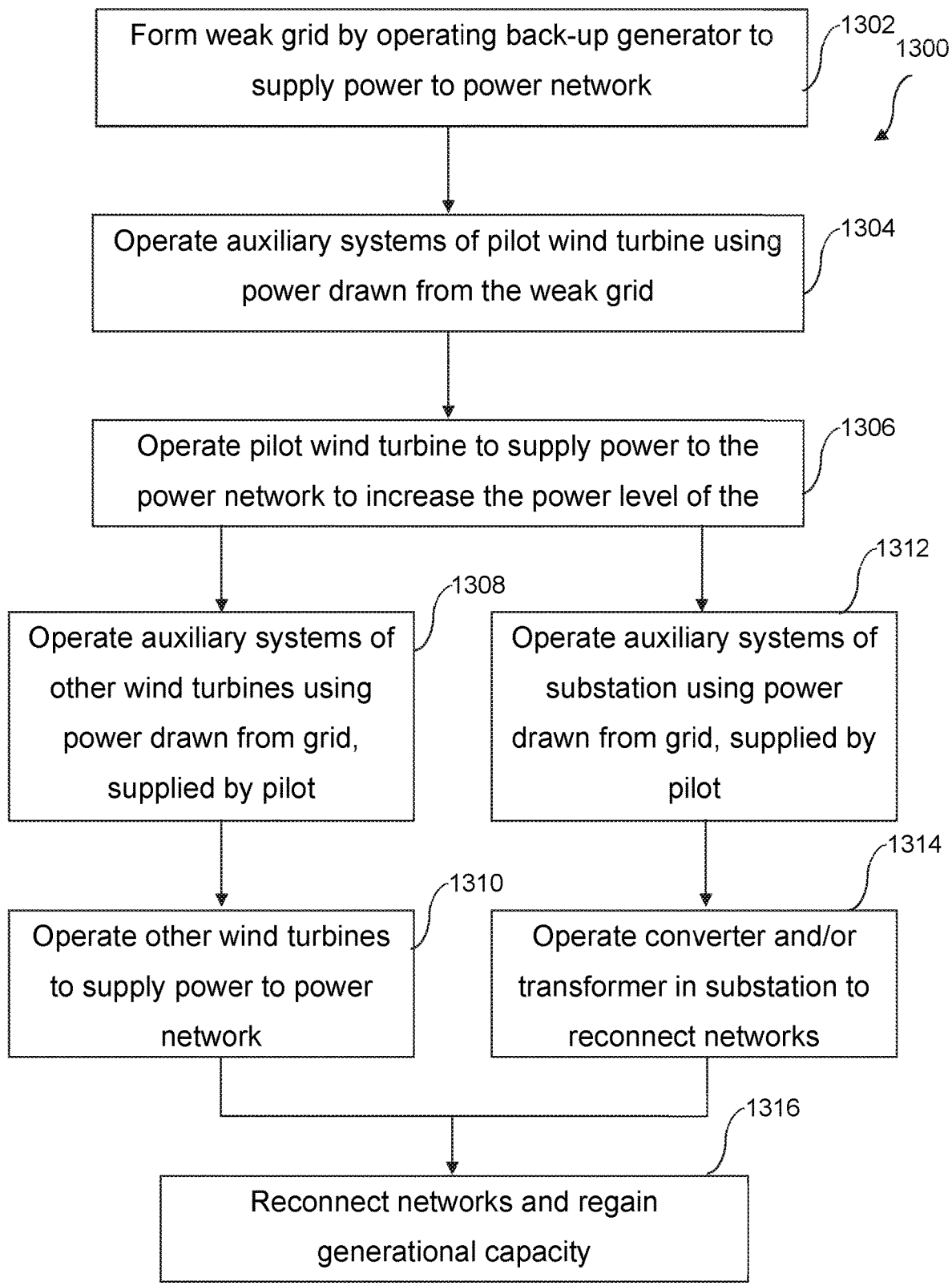
FIGS. 13 and 14 illustrate flow charts for controlling a wind park according to an embodiments described in this present disclosure.

The power from the pilot turbine or other grid-forming turbines (as more than one pilot turbine may be designated to help reform the grid after the initial steps 1302 to 1306) may be utilized to power the auxiliary systems in the substation and the AC/DC converter and/or transformer in the substation for connecting the park to the HVDC link, which is shown at steps 1312 and 1314 of FIG. 13. Once the HVDC link and AC/DC converter in the substation are active again, along with other auxiliary systems in the substation, the rest of the turbines may be brought back to life to generate power and begin providing power to the onshore grid once more, as shown in FIG. 13 at 1316. Once the HVDC link is available again, or the grid fault is cleared in other aspects, the turbines may all return to a grid-following mode of operation. Performing this method 1300 in this way results in the return of the rest of the turbines being performed seamlessly, with minimum voltage and/or current spikes or glitches—i.e. there is a smooth ramping of the power generation to full or substantially full capacity.

Thus the process can be summarized by a change in generational power, from no grid being formed due to the loss of the HVDC link and the shutdown of the turbines, to a weak grid being formed by the back-up generator, to a grid formed by the pilot turbine, to an increasingly higher power, islanded grid as more and more turbines return to operation by drawing power from the local grid, and eventually returning to an operational local grid and substation that is reconnected via the HVDC link.

While the above method is discussed in relation to a HVDC link, the method may be used for any link between an offshore park and an onshore grid when that link is unavailable. The above method may be combined with any of the features described in the embodiments above, particularly in relation to FIGS. 1 to 12. Features described in relation to others are able to be combined with features of this method in isolation or in combination with others.

In the second scenario, the offshore park is connected to the onshore grid by an HVAC link, and so no AC/DC conversion is performed at the offshore park for transmission to the onshore grid. In some examples of an HVAC link, one or more substation may be provided between the offshore and onshore grids and parks in which is provided one or more transformers. During failures of the onshore grid, such as during a blackout, the AC link remains active, and so the onshore grid and offshore park remain in communication. FIG. 10 illustrates a system such as this. Typically, a failure of the onshore grid causes all onshore turbines to shut down and a cascading failure may cause the offshore turbines to be shut down also. Accordingly, the system begins from a point of essentially zero power generation.

In these situations, a brown start may also be performed. In this example, instead of a back-up generator being provided at a substation of the offshore park, the back-up generator is provided at the onshore grid. The back-up generator is typically separate from the onshore wind turbines, i.e. not incorporated within a wind turbine, but in some circumstances may be provided within a turbine. The back-up generator, during a brown start, may be running already during normal operation or may begin in response to the fault being identified. The back-up generator forms a grid on the onshore grid. The formed grid is weak due to the small size of the back-up generator in comparison to the load capacity or MVA rating of the wider network at the connection point of the offshore park.

As the AC link exists and power can be drawn along it without conversion, the weak grid formed by the back-up generator is accessible to a pilot wind turbine in the offshore park. The pilot turbine draws power from the weak grid created by the back-up generator to energize its auxiliary systems as described above in relation to the first scenario. The process is similar thereafter, with the cascade of restarting turbines powering each other at the offshore park and creating a progressively stronger grid, before turbines from an onshore park can also begin to draw power from the grid to begin powering-up again. In some embodiments, the use of a single pilot turbine may enable an onshore park to begin generation again.

Accordingly, a brown-start operation is capable by creating a weak grid onshore using a back-up generator, drawing power through an offshore turbine to power its auxiliary systems and to begin generation again to form a stronger grid, and subsequently drawing power from the offshore turbine, some of the offshore turbines, or the entire offshore park to the onshore grid to onshore turbines to restart generation across the wider power network.

In each brown start scenario, there is an increase in grid-forming with each new generator that contributes to the grid, from the initial back-up generator, through increasing numbers of wind turbines. The turbines may also enable larger generators to resume operation, for example in hydro-electric or fossil fuel power plants.

Figure 14:
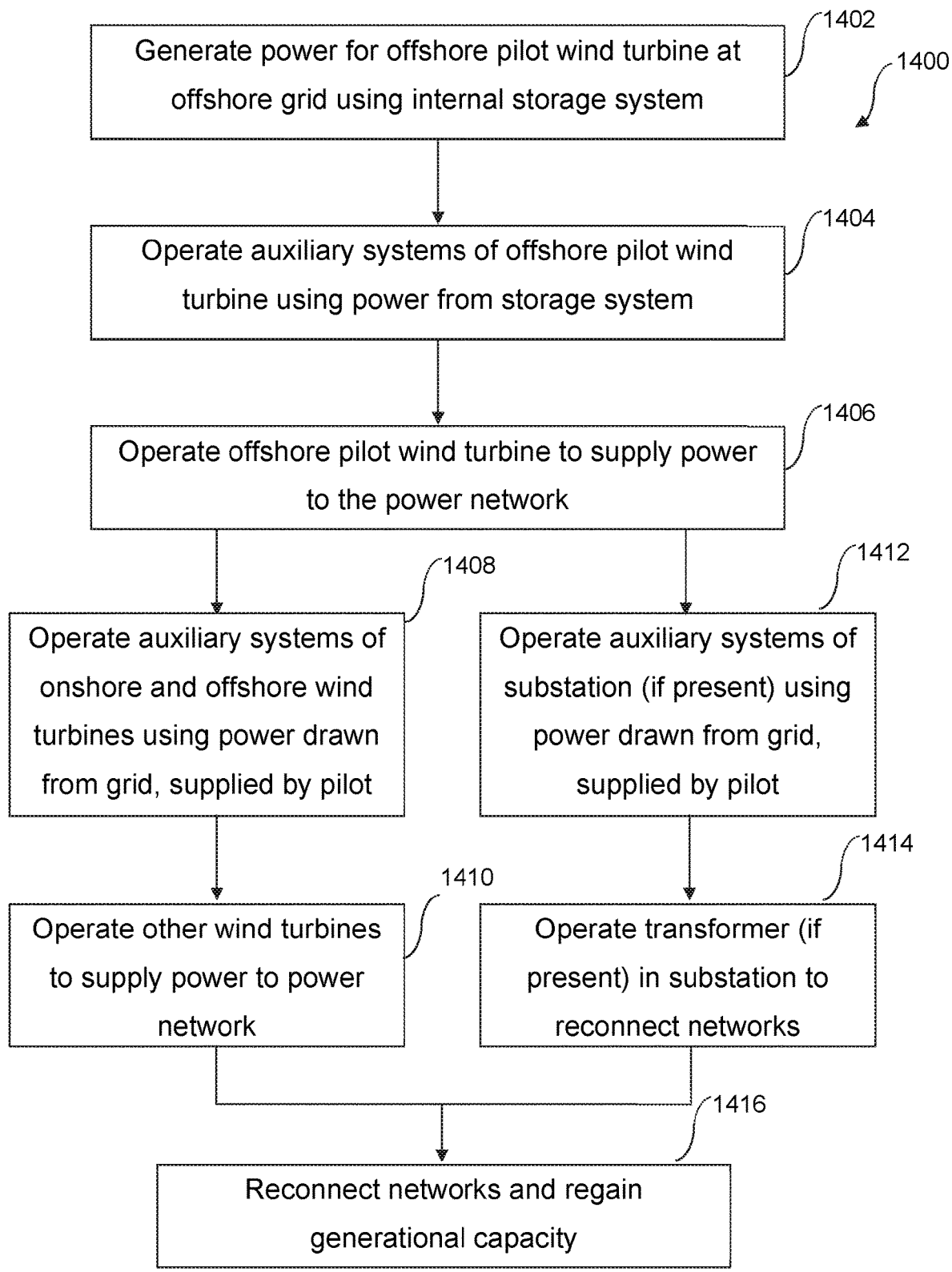

Systems employing an AC link may also enable a black start, an example of which is shown as a method 1400 in FIG. 14. In a black start, a pilot turbine or grid forming turbines utilize internal storage systems to maintain or provide a power supply to their auxiliary systems. Internal storage systems may comprise battery energy storage systems, solar cells, fuel cells, and/or a generator such as a diesel or gas generator.

The discharge of an internal storage system to power or re-power auxiliary systems enables the turbine to resume power generation and to supply power to other turbines to perform the same action. This process is found at steps 1402 to 1406 of FIG. 14. Accordingly, in the same way, power is supplied to a single turbine which in turn re-powers other turbines by providing auxiliary power to enable their auxiliary systems to become active, as shown at steps 1408 and 1410 of FIG. 14. If a substation is present with a transformer, the pilot or grid-forming turbines may be utilized to provide power to repower the substations auxiliary systems and transformer as appropriate, as shown at steps 1412 and 1414 of FIG. 14. Thus, the networks can be reconnected, as at step 1416.

In either scenario the operation of the back-up generator or internal storage to enable the black or brown start may be performed at a determined time. A park controller may instruct the black or brown start only when wind speeds are sufficient to sustain generation by the pilot turbine to repower other turbines within the system. Such a control may involve a determination by the park controller of a wind speed and comparison of a wind speed against a threshold value, or a prediction of wind speeds in a future period and comparison of the wind speeds against a threshold value.

In embodiments where a substation is provided, the back-up generator may be provided in the substation. For example, the substation may comprise a converter and/or a transformer, and the back-up generator may be utilized to power the pilot turbine, which in turn either in combination with the back-up generator or alone, provides the power to operate the auxiliary systems of the substation.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention may be embodied in one or more of the following examples. According to a first example, there is provided a method, comprising: upon determining a high-voltage DC (HVDC) link disposed in a substation for a wind turbine park is unavailable: operating a backup generator disposed in the substation to provide power to auxiliary systems in the substation, and operating a plurality of wind turbines in the wind turbine park using an auxiliary control system, wherein the plurality of wind turbines provide auxiliary power to supplement the power provided to the auxiliary systems by the backup generator; and upon determining the HVDC link is functioning, operating the plurality of wind turbines using a primary control system to transmit power on the HVDC link, wherein the primary control system is different from the auxiliary control system.

In a second example, the wind turbine park may be an offshore turbine park, the HVDC link may couple the offshore turbine park to an onshore grid, and/or the plurality of wind turbines may not contain backup generators.

In a third example, the plurality of wind turbines may be disposed remotely from the substation and/or at least one of the plurality of wind turbines may be a grid following turbine and at least one of the plurality of wind turbines may be a grid forming turbine.

In a fourth example operating the backup generator and the plurality of wind turbines to provide power to the auxiliary systems may comprise: powering at least one of a cooling system for an AC-DC converter and a pump disposed on the substation.

In a fifth example, the method may comprise: synchronizing, when operating using the auxiliary control system, voltages and frequencies corresponding to the plurality of wind turbines to a local AC grid in the wind turbine park.

In a sixth example, the backup generator may be a fossil fuel generator and may be disposed on the substation.

In a seventh example, when operating using the auxiliary control system, the plurality of wind turbines may provide power to an auxiliary system disposed in at least one shutdown wind turbine in the wind turbine park.

In an eighth example, the method may comprise: reducing, when the HVDC link is unavailable, the power generated by the backup generator upon determining the plurality of wind turbines produce sufficient auxiliary power when using the auxiliary control system; and deactivating the backup generator after determining the HVDC link is available.

According to a ninth example, there is provided a method, comprising: upon determining a fault in an onshore grid, operating a plurality of wind turbines in an offshore wind turbine park using an auxiliary control system to provide auxiliary power to the onshore grid, wherein the onshore grid is AC coupled to the plurality of wind turbines by a grid transformer and a circuit breaker disposed in a substation in the offshore wind turbine park; and switching the plurality of wind turbines from using the auxiliary control system to a primary control system to restore the onshore grid, wherein the primary control system is different from the auxiliary control system.

According to a tenth example, the method may comprise: operating an onshore backup generator to provide auxiliary power to the onshore grid in parallel with operating the plurality of wind turbines using the auxiliary control system, wherein the power provided by the onshore backup generator supplements the power provided by the plurality of wind turbines to restore the onshore grid.

According to an eleventh example, the onshore backup generator may be maintained in a hot-standby state before the fault in the onshore grid so that backup power is immediately available when the fault occurs.

According to a twelfth example, operating the plurality of wind turbines using the auxiliary control system may be part of a brown start where the onshore grid is a weak grid that receives partial power from the onshore backup generator.

According to thirteenth example, when operating using the auxiliary control system, the plurality of wind turbines may provide power to an offshore power plant separate from the offshore wind turbine park to supplement power provided by a backup generator at the offshore power plant.

According to a fourteenth example, operating the plurality of wind turbines using the auxiliary control system may be part of a black start where the onshore grid is unpowered.

According to a fifteenth example, the plurality of wind turbines may be separate from the substation.

In view of the foregoing, the scope of the present disclosure is determined by the claims that follow.

What is claimed is:

1. A method for controlling a renewable power plant, the renewable power plant comprising a wind turbine park comprising a plurality of wind turbines connected to a local grid and to a substation having a backup generator and an AC/DC converter, wherein a high-voltage DC (HVDC) link connects the renewable power plant to a second grid via the AC/DC converter, the method comprising, upon determination that the HVDC link is unavailable:
   operating the backup generator disposed in the substation to supply power to the local grid, thereby forming a weak grid;
   operating one or more auxiliary systems within a pilot wind turbine of the plurality of wind turbines using power drawn from the weak grid; and
   operating the pilot wind turbine to supply power to the local grid to increase a power level of the weak grid formed on the local grid.

2. The method of claim 1, comprising, while the pilot wind turbine is supplying power to the local grid:
   operating one or more auxiliary systems within one or more of the remaining wind turbines of the plurality of wind turbines using power drawn from the local grid; and
   operating the one or more remaining wind turbines to supply power to the local grid.

3. The method of claim 1, comprising, while the pilot wind turbine is supplying power to the local grid:
   operating one or more auxiliary systems within the substation using power drawn from the local grid; and
   operating the AC/DC converter using power drawn from the local grid to reconnect the park with the HVDC link.

4. The method of claim 3, wherein operating the one or more auxiliary systems within the substation comprises:
   powering at least one of an air conditioning system, heating, or cooling system for an AC/DC converter and a pump disposed on the substation.

5. The method of claim 1, wherein the pilot or remaining wind turbines are operated using an auxiliary control system while the HVDC link is unavailable, and wherein the method comprises, upon determining that the HVDC link is functioning, operating the plurality of wind turbines using a primary control system to transmit power on the HVDC link, wherein the primary control system is different to the auxiliary control system.

6. The method of claim 1, wherein the wind turbine park is an offshore turbine park and the second grid is an onshore grid, wherein the plurality of wind turbines do not contain backup generators.

7. The method of claim 1, further comprising:
   synchronizing voltages and frequencies corresponding to the plurality of wind turbines to a local AC grid in the wind turbine park.

8. The method of claim 1, wherein the backup generator comprises a battery energy storage system.

9. A method for controlling a power network, the power network comprising an offshore wind turbine park comprising a plurality of offshore wind turbines connected to an offshore local grid and an onshore wind turbine park comprising a plurality of onshore wind turbines connected to an onshore grid, the onshore and offshore parks being connected by an AC link, the method comprising, upon determination that a fault has occurred in the power network:
   supplying back-up power to a pilot wind turbine of the plurality of offshore wind turbines, thereby forming a weak grid;
   operating one or more auxiliary systems within the pilot wind turbine using the back-up power; and
   operating the pilot wind turbine to supply power to the power network to contribute to forming the weak grid.

10. The method of claim 9, wherein supplying back-up power to a pilot wind turbine comprises:
    operating an onshore backup generator to provide auxiliary power to the onshore grid and the offshore local grid via the AC link.

11. The method of claim 10, comprising, prior to determining the fault, maintaining the onshore backup generator in a hot-standby state so that backup power is available when the fault occurs.

12. The method of claim 9, wherein supplying back-up power to a pilot wind turbine comprises:
    drawing power from energy storage housed within the pilot wind turbine.

13. The method of claim 9, comprising, while the pilot wind turbine is supplying power to the power network:
    operating one or more auxiliary systems within one or more of the onshore wind turbines using power drawn via the AC link; and
    operating the one or more onshore wind turbines to supply power to the onshore grid.

14. The method of claim 9, wherein at least the pilot wind turbine is operated using an auxiliary control system while the fault is occurring, and wherein the method comprises, upon determining that the fault has passed, operating the plurality of wind turbines using a primary control system to supply power on the power network, wherein the primary control system is different to the auxiliary control system.

15. The method of claim 9, further comprising:
    synchronizing voltages and frequencies corresponding to the plurality of offshore wind turbines to the offshore local grid.

16. A method for controlling a power network, the power network comprising an offshore wind turbine park comprising a plurality of offshore wind turbines connected to an offshore local grid and an onshore wind turbine park comprising a plurality of onshore wind turbines connected to an onshore grid, the onshore and offshore parks being connected by an AC link, the method comprising, upon determination that a fault has occurred in the power network:
    supplying back-up power to a pilot wind turbine of the plurality of offshore wind turbines, comprising operating an onshore backup generator to provide auxiliary power to the onshore grid and the offshore local grid via the AC link, thereby forming a weak grid;
operating one or more auxiliary systems within the pilot wind turbine using the back-up power;
operating the pilot wind turbine to supply power to the power network to contribute to forming the weak grid, wherein at least the pilot wind turbine is operated using an auxiliary control system while the fault is occurring;
while the pilot wind turbine is supplying power to the power network:
  operating one or more auxiliary systems within one or more of the onshore wind turbines using power drawn via the AC link; and
  operating the one or more onshore wind turbines to supply power to the onshore grid; and
upon determining that the fault has passed, operating the plurality of wind turbines using a primary control system to supply power to the power network, wherein the primary control system is different to the auxiliary control system.

17. The method of claim 16, further comprising:
prior to determining the fault, maintaining the onshore backup generator in a hot-standby state so that backup power is available when the fault occurs.

18. The method of claim 16, wherein supplying back-up power to the pilot wind turbine comprises:
drawing power from energy storage housed within the pilot wind turbine.

19. The method of claim 16, further comprising:
synchronizing voltages and frequencies corresponding to the plurality of wind turbines to the onshore grid and the offshore local grid.

* * * * *